(12) United States Patent
Kissa et al.

(10) Patent No.: US 7,529,433 B2
(45) Date of Patent: May 5, 2009

(54) HUMIDITY TOLERANT ELECTRO-OPTIC DEVICE

(75) Inventors: Karl Kissa, West Simsbury, CT (US); William J. Minford, Windsor, CT (US); Jason Jiazhan Xu, Weatogue, CT (US); Glen Drake, Windsor, CT (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/971,726

(22) Filed: Jan. 9, 2008

(65) Prior Publication Data
US 2008/0170818 A1    Jul. 17, 2008

Related U.S. Application Data

(60) Provisional application No. 60/884,653, filed on Jan. 12, 2007.

(51) Int. Cl.
*G02F 1/295* (2006.01)
*G02B 6/12* (2006.01)

(52) U.S. Cl. .............................. 385/8; 385/14
(58) Field of Classification Search ................ 385/8, 385/14
See application file for complete search history.

(56) References Cited

U.S. PATENT DOCUMENTS

| | | | | |
|---|---|---|---|---|
| 5,214,724 A | 5/1993 | Seino et al. | | 385/2 |
| 5,339,369 A | 8/1994 | Hopfer et al. | | 385/2 |
| 5,359,449 A | 10/1994 | Nishimoto et al. | | 359/181 |
| 5,388,170 A | 2/1995 | Heismann et al. | | 385/4 |
| 5,404,412 A | 4/1995 | Seino et al. | | 385/2 |
| 5,455,876 A | 10/1995 | Hopfer et al. | | 385/2 |
| 5,680,497 A | 10/1997 | Seino et al. | | 385/129 |
| 5,895,742 A | 4/1999 | Lin | | 430/321 |
| 6,195,191 B1 | 2/2001 | Osenback et al. | | 359/238 |
| 6,198,855 B1 | 3/2001 | Hallemeier et al. | | 385/2 |
| 6,282,356 B1 | 8/2001 | Johnston, Jr. et al. | | 385/129 |
| 6,310,700 B1 | 10/2001 | Betts | | 359/2 |
| 6,411,747 B2 | 6/2002 | Rangary | | 385/2 |

(Continued)

FOREIGN PATENT DOCUMENTS

EP    0 813 093    12/1997

(Continued)

OTHER PUBLICATIONS

Oh et al, "Recent Advances in Electrooptic Polymer Modulators Incorporating Highly Nonlinear Chromophore", IEEE J. Quantum Electron., vol. 7, No. 5, pp. 826, 2001.

(Continued)

*Primary Examiner*—Charlie Peng
(74) *Attorney, Agent, or Firm*—Allen, Dyer, Doppelt, Milbrath & Gilchrist, P.A.

(57) ABSTRACT

The invention relates to an electro-optic modulator structure containing an additional set of bias electrodes buried within the device for applying bias to set the operating point. Thus the RF electrodes used to modulate incoming optical signals can be operated with zero DC bias, reducing electrode corrosion by electro-migration and other effects that can be present in non-hermetic packages. The bias electrodes include an upper split portion and an optically transparent lower portion. The optically transparent lower layer improves modulation frequency and reduces optical loss.

23 Claims, 16 Drawing Sheets

U.S. PATENT DOCUMENTS

| | | | |
|---|---|---|---|
| 6,449,080 B1 | 9/2002 | McBrien et al. | 359/245 |
| 6,558,585 B1 | 5/2003 | Zhang et al. | 264/1.27 |
| 6,560,377 B2 | 5/2003 | Jones et al. | 385/2 |
| 6,583,917 B2 | 6/2003 | Melloni et al. | 359/245 |
| 6,646,776 B1 | 11/2003 | Cheung et al. | 359/254 |
| 6,674,565 B2 | 1/2004 | Kondo et al. | 359/322 |
| 6,741,762 B2 | 5/2004 | Grinberg et al. | 385/20 |
| 6,819,851 B2 | 11/2004 | Aoki et al. | 385/129 |
| 6,853,757 B2 | 2/2005 | Seino et al. | 385/2 |
| 6,867,134 B2 | 3/2005 | Chen et al. | 438/686 |
| 6,950,579 B2 | 9/2005 | Ahn et al. | 385/40 |
| 6,978,056 B2 | 12/2005 | Tavlykaev | 385/2 |
| 7,127,128 B2 | 10/2006 | Belmonte et al. | 385/2 |
| 7,231,102 B2 | 6/2007 | Ridgway | 385/9 |
| 7,315,662 B2 | 1/2008 | Hunt et al. | 385/2 |
| 7,394,950 B2 * | 7/2008 | Sugiyama | 385/8 |
| 2003/0062551 A1 | 4/2003 | Chen | 257/211 |
| 2003/0091257 A1 | 5/2003 | Chakrabarti et al. | 385/2 |
| 2003/0133638 A1 | 7/2003 | Jin et al. | 385/2 |
| 2006/0023288 A1 | 2/2006 | McBrien et al. | 359/245 |
| 2006/0198581 A1 * | 9/2006 | Belmonte et al. | 385/40 |
| 2007/0116475 A1 | 5/2007 | McBrien et al. | 398/164 |
| 2007/0146859 A1 | 6/2007 | Yang et al. | 359/237 |
| 2007/0147725 A1 | 6/2007 | Crespi et al. | 385/9 |
| 2008/0069491 A1 | 3/2008 | Kissa et al. | 385/2 |

FOREIGN PATENT DOCUMENTS

JP   1789177   9/1993

OTHER PUBLICATIONS

Hopfer, et. al., "A novel wideband, lithium niobate electrooptic modulator," Journal of Lightwave Technology, vol. 16, No. 1, Jan. 1998, pp. 73-77.

* cited by examiner

HUMIDITY TOLERANT ELECTRO-OPTIC DEVICE

CROSS-REFERENCE TO RELATED APPLICATIONS

This application claims priority from U.S. Provisional Patent Application No. 60/884,653 filed Jan. 12, 2007, which is hereby incorporated by reference for all purposes.

TECHNICAL FIELD

The present invention relates generally to electro-optic devices and, more specifically, to electro-optic devices used in fiber-optic telecommunications.

BACKGROUND OF THE INVENTION

Electro-optic devices are frequently used in fiber-optic telecommunication systems to manipulate optical signals. In general, these electro-optic devices include at least one optical waveguide formed from and/or in an electro-optic material. When an electric field is generated in the electro-optic material, the refractive index of the optical waveguide(s) change and the optical signal propagating there through can be altered. Some examples of common electro-optic devices used in telecommunication systems include optical modulators, optical switches, optical couplers, etc.

One example of a particularly successful electro-optic device is the Mach-Zehnder (MZ) optical modulator. Referring to FIG. 1a, there is shown an embodiment of a Mach-Zehnder optical modulator having an optical waveguide 20 formed in an electro-optic substrate 10. The optical waveguide 20 includes a first Y-branch 22, a first interferometer arm 24, a second interferometer arm 26, and a second Y-branch 28. An electrode structure (not shown in FIG. 1a) is provided near/adjacent the optical waveguide 20 for generating an electric field in one or both interferometer arms 24/26. For example according to one well known configuration, the electrode structure includes a signal electrode (also often referred to as a hot electrode) and two ground electrodes, which are configured to generate oppositely oriented electric fields in the first 24 and second 26 interferometer arms. Conventionally, the electrode structure is formed from a highly conductive metal such as gold (Au). The exact position and design of the electrodes relative to the optical waveguide 20 is generally dependent on the substrate. For example, if the substrate is formed from X-cut lithium niobate ($LiNbO_3$), the signal electrode 40 is typically positioned on top of the substrate substantially between the interferometer arms 24/26, while the ground electrodes 42/44 are positioned on top of the substrate outside of the interferometer arms 24/26 (e.g., as illustrated in FIG. 1b). In contrast, if the substrate is formed from Z-cut $LiNbO_3$, the signal electrode 40 is typically positioned substantially above one interferometer arm 26, while the ground electrode 42 is positioned substantially above the other interferometer arm 24 (e.g., as illustrated in FIG. 1c). In each case, the ground electrodes 42,44 are typically connected to ground, while the signal electrode 40 is connected to a high-frequency power source.

Referring to FIG. 1d there is shown an embodiment of a Z-cut $LiNbO_3$ modulator 100, wherein the signal electrode 140 is connected to a high-frequency power source 145 at one end and to a terminal resistor at the other end, such that it functions as a traveling-wave electrode. In operation, an optical signal is input into the left side of the device 100 where it is transmitted through the optical waveguide 120 until it is split at the first Y-branch 122, and then propagates equally along the two isolated paths corresponding to the two interferometer arms 124/126. Simultaneously, an RF data signal from the high-frequency power source 145 is transmitted through an RF transmission line 147 (e.g., a co-axial cable) to the signal electrode 140, which functions as a microwave transmission line. As the modulation voltage is applied between the signal electrode 140 and the ground electrodes 142 and 144, an electric field is generated in the underlying electro-optic substrate 110. As illustrated in FIG. 1e, the vertical electric field lines in the first 124 and second 126 interferometer arms are oppositely oriented such the light propagating in each of the arms is complementarily phase shifted relative to one another in a push-pull fashion. In accordance with the electro-optic effect, the electric field changes the refractive index within the interferometer arms such that the input optical signal experiences constructive or destructive interference at the second Y-branch 128. This interference produces an amplitude modulated optical signal that is output the right side of the device, wherein the modulation corresponds to the original RF data signal.

Notably, since the Z-axis of a $LiNbO_3$ crystal has the highest electro-optic coefficient, Z-cut $LiNbO_3$ modulators exhibit a relatively high modulation efficiency. Unfortunately, Z-cut $LiNbO_3$ modulators are also known to suffer more from charge build up problems, which for example, may lead to temperature induced bias drift and/or DC drift.

Temperature induced bias drift refers to when the operating (bias) point of the modulator shifts with changes in temperature. In $LiNbO_3$, temperature induced bias drift typically arises from the pyroelectric effect, which creates mobile charge when temperature fluctuations occur in the substrate. The mobile charge can generate strong electric fields that can change the operating (bias) point of the electro-optic modulator. In addition, since the electric fields induced by the pyroelectric effect in Z-cut $LiNbO_3$ are predominantly normal to the substrate, the mobile charge moves toward the surface of the substrate, where the electrodes 140, 142, 144 are located. Accordingly, a bleed layer 160 is typically required near the surface of Z-cut $LiNbO_3$ to dissipate accumulated electric charge. Optionally, additional bleed layers (not shown) are used to dissipate charge at the sides or bottom of the substrate. In general, the bleed layer 160 will be formed from a semiconductive material so that the highly conductive electrodes 140/142/144 are prevented from shorting out.

DC drift refers to when the operating (bias) point of the modulator shifts as a low frequency or DC voltage is applied to the modulator for extended periods of time. In general, low frequency or DC voltages are required to control the operating (bias) point of the modulator (i.e., the point about which the swing of the modulated RF signal is accomplished). For example in the embodiment described with reference to FIG. 1d, the RF data signal corresponds to a modulation signal that includes an RF component superimposed on a DC or low frequency component.

DC drift, also termed bias drift, is particularly problematic when the modulator includes a buffer layer 150 disposed between the substrate 110 and the signal electrode 140. If the buffer layer 150 has little conductivity relative to the substrate 110, mobile charge within the substrate, which may be in the form of electrons, holes, or ions, counteracts the effect of the applied voltage, establishing a positive DC drift. In addition, impurities in the buffer layer 150, which is typically formed from a dielectric material such as silicon dioxide ($SiO_2$), are believed to form additional mobile charge, which either counteract the effect of the applied voltage, establishing a positive DC drift, or enhance the applied bias voltage, establishing a negative DC drift. The former is more common for undoped $SiO_2$. The end result of the mobile charge in the buffer and substrate is that the bias voltage required to operate the electro-optic modulator increases over time.

The purpose of the buffer layer 150 is two-fold. First, the buffer layer 150 is used to prevent optical absorption of the optical signal by the overlying electrodes 140/142. Notably, this is more important for Z-cut embodiments, wherein the electrodes 140/142 lie directly over the interferometer arms 126/124. Secondly, the buffer layer 150 is used to speed up the propagation of the RF modulation signal so that the optical wave and the microwave propagate with equal phase velocities, thus increasing the interaction length, and as a result, increasing modulation bandwidth and/or efficiency at high frequencies.

Various solutions to prevent dc drift have been proposed. For example, in X-cut $LiNbO_3$ modulators it has been proposed to provide a separate low-frequency bias electrode structure 270, optically in series with an RF electrode structure 240, as illustrated in FIG. 2. A buffer layer 250 is provided below the RF electrode structure 240, to provide velocity matching, but is eliminated below the bias electrode structure 270, to reduce DC drift. Conveniently, since the bias electrode structure 270 is deposited directly on the substrate, the required drive (bias) voltage is significantly reduced. Unfortunately, in order to accommodate both electrode structures, the length of the modulator is significantly increased. In addition, this design is not ideal for Z-cut $LiNbO_3$, wherein the waveguides are located directly below the bias electrodes, because the highly conductive bias electrode material (e.g., Au) may introduce significant optical loss.

In Z-cut $LiNbO_3$ modulators, dc drift has been reduced by modifying the buffer layer. For example in U.S. Pat. Nos. 5,404,412 and 5,680,497, the effect of the buffer layer charging in optical modulators is reduced by doping the buffer layer, causing it to be more conductive. The added conductivity in essence shorts out the buffer layer, preventing the buffer layer from charging up and stealing all of the applied voltage from the waveguides. Accordingly, a DC or slowly varying voltage applied to the signal electrode is able to control the bias point of the modulator over time. Unfortunately, it can be difficult to quantitatively control the introduction of the doping elements with a high reproducibility. Furthermore, water may be absorbed by the conductive buffer layer, changing its properties. In addition, the required drive (bias) voltage may be relatively high because the generated electric field must pass through the conductive buffer layer (e.g., which may be quite thick for Z-cut configurations). In US Patent Application Publication No. 2003/0133638 DC drift is reduced by implanting a $SiO_2$ buffer layer with fluorine ions. The negative fluorine ions ($F^-$) are believed to react with positive ions, such as lithium ($Li^+$) from the substrate, to form stable compounds such as LiF. The reduction in the number of mobile $Li^+$ ions then results in a reduction in DC drift. Again, the required drive (bias) voltage may be relatively high because the generated electric field must pass through the ion-implanted buffer layer (e.g., which may be quite thick for Z-cut configurations).

In US Patent Application Publication No. 2006/0023288 and U.S. Pat. No. 7,127,128, DC drift is reduced by providing a separate low-frequency bias electrode structure substantially aligned with an overlying RF electrode structure. For example, consider the prior art X-cut embodiment illustrated in FIGS. 3a and 3b, wherein a dielectric buffer layer 350 is provided below the RF electrode structure 340/342/344, to provide velocity matching, but is eliminated below the bias electrode structure 370/372/374, to reduce DC drift. Advantageously, this configuration provides a relatively short modulator (i.e., since the bias and RF electrode structures are stacked) with a relatively low drive voltage (i.e., since the bias electrode structure is deposited directly on the substrate 310). Further advantageously, the bias electrode structure 370/372/374 is fabricated from a material having a high resistivity, which is conductive at low frequencies and functions as a dielectric at high-frequencies. Accordingly, the bias electrode structure can be deposited on the substrate without introducing significant loss.

US Patent Application Publication No. 2006/0023288 also describes numerous low bias drift embodiments for Z-cut $LiNbO_3$ modulators. Referring to FIGS. 4a and 4b, the Z-cut embodiments typically include two bias signal electrodes, each of which is split into two separate elongated segments. More specifically, each segment of each split bias electrode 470/476 is shifted laterally to an opposite side of the corresponding waveguide segment 426/424. Again, a dielectric buffer layer 450 is provided below the bleed layer 460 and RF electrode structure 440, 442, 444, to provide velocity matching, but is eliminated below the bias electrode structure 470, 472, 474, 476, to reduce DC drift. Advantageously, this configuration provides a relatively short modulator (i.e., since the bias and RF electrode structures are stacked) with a relatively low drive voltage (i.e., since the bias electrode structure is deposited directing on the substrate 410). Further advantageously, since the bias signal electrodes 470, 476 are split, and are not disposed directly over the interferometer arms 426, 424, respectively, optical loss is reduced.

Yet another advantage of many of the embodiments described in US Patent Application Publication No. 2006/0023288 is improved humidity tolerance. As is well known in the art, the presence of high magnitude electric fields and high humidity often results in corrosion of electro-optic devices. For example, when a metal adhesion layer (e.g., Ti, Ti/W, Cr, etc) is used to promote adhesion between an RF electrode (e.g., Au) and an electro-optic substrate (e.g., $LiNbO_3$), any moisture in direct contact with the multi-layer structure will serve as an electrolyte that induces galvanic corrosion. Galvanic corrosion, which results from the difference in electrochemical potentials of dissimilar metals, can create a conductive deposit between the surface RF electrodes, which causes current leakage, short circuit, or peeling of the RF electrodes. Various schemes have been proposed to obviate galvanic corrosion, and thus reduce the need for a hermetic package. For example, in U.S. Pat. No. 6,867,134 the adhesion layer is eliminated, whereas in US Patent Application Publication No. 2003/0062551 the adhesion layer is encapsulated. Alternatively, the adhesion layer can be made of a thin metal, such as nickel, which has a work function similar to gold. While these methods do suppress galvanic corrosion, electro-migration corrosion can still occur. Electro-migration corrosion occurs when a large DC voltage is applied across closely-spaced electrodes (e.g., gold RF electrodes) in the presence of water or a high humidity level. Similar to galvanic corrosion, electro-migration corrosion negatively impacts the performance and reduces the service life of electro-optic devices. As a result, electro-optic devices are often coated as shown in U.S. Pat. No. 6,560,377 and/or sealed in hermetic packages. However, the coatings negatively impact the RF properties of the RF electrode, and hermetic packaging adds cost to the modulator.

In US Patent Application Publication No. 2006/0023288 humidity tolerance is increased in various ways. For example in some embodiments, the large DC voltage is applied to bias electrodes that are disposed beneath a buffer layer, whereas in other embodiments the large DC voltage is applied to bias electrodes that are disposed below the substrate. Since these buried bias electrodes are protected from humidity, electro-migration corrosion of the buried bias electrodes is reduced. Moreover, if the buried bias electrodes are DC isolated from the RF electrodes, then electro-migration corrosion of the RF electrodes is also minimized. Furthermore, if the adhesion layer is eliminated, encapsulated, and/or formed of a material with a work function similar to that used to form the RF electrode, then both galvanic and electro-migration corrosion mechanisms are eliminated, enabling low cost non-hermetic packaging of the modulator.

In addition, improved humidity tolerance is also provided by fabricating the bias electrodes from a high resistivity material (e.g., a material having an electrical resistivity substantially higher than that of the RF electrodes, but substantially lower than the substrate). Notably, these high resistivity bias electrodes have been found to be significantly more robust than prior art high-conductivity bias electrodes (e.g., fabricated from gold). Unfortunately, selection of the high resistivity material is generally accompanied with a compromise in at least one of RF transparency, optical transparency, and series resistance. For example, while indium oxide ($In_2O_3$) is reasonably optical transparent, with a resistivity of approximately 1 ohm-cm ($\Omega$-cm) @25° C. there may be some RF signal loss. In contrast, while TaSiN having a resistivity in the range of about ~$10^4$ to $10^6$ $\Omega$-cm @25° C. is reasonably transparent to the RF signal, it may introduce some optical loss if deposited directly above an optical waveguide.

In U.S. Pat. No. 6,853,757 Seino teaches using a transparent conductive film underneath a highly conductive metal electrode to apply a voltage to an electro-optic substrate. The highly conductive metal electrode (e.g., gold) is shifted laterally with respect to the center of the waveguide to minimize optical loss. However, since the transparent conductive film (e.g., indium tin oxide (ITO)) is intended to carry both high and low frequency signals from the highly conductive electrode to the waveguide, the electro-optic device is not humidity tolerant and must be coated as shown in U.S. Pat. No. 6,560,377 and/or sealed in a hermetic package.

SUMMARY OF THE INVENTION

The instant invention relates to humidity tolerant electro-optic devices having a separate bias electrode structure, wherein the bias electrode includes a first portion and a second portion, and wherein the second portion is fabricated from a different material and/or with a different thickness than the first portion to improve optical transparency of the bias electrode for an optical signal propagating through an underlying optical waveguide.

According to one aspect of the present invention there is provided an electro-optic device comprising: a substrate having an optical waveguide formed therein; a bias electrode structure disposed for generating a low frequency or DC electric field in the optical waveguide, the bias electrode structure including a first bias electrode having an first portion and a second portion, the first portion including a strip substantially aligned with the optical waveguide, the first portion having a higher transparency than the second portion; an RF electrode structure disposed for generating an RF electric field in the optical waveguide, the RF electrode structure including a first RF electrode; and a buffer layer disposed between the first RF electrode and the first bias electrode.

According to one aspect of the present invention there is provided a method of fabricating an electro-optic device comprising: providing a substrate having an optical waveguide formed therein; forming a first bias electrode layer on the substrate, the first bias electrode layer patterned to provide a strip substantially aligned with the optical waveguide; forming a second bias electrode layer on at least one of the first bias electrode layer and the substrate, the second bias electrode layer patterned to include at least one strip shifted laterally relative to the center of the optical waveguide, the first bias electrode layer having a higher optical transparency than the second bias electrode layer; forming a buffer layer on the first and second bias electrode layers; and forming an RF electrode layer on the buffer layer, the RF electrode layer patterned to include a first RF electrode.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1A:
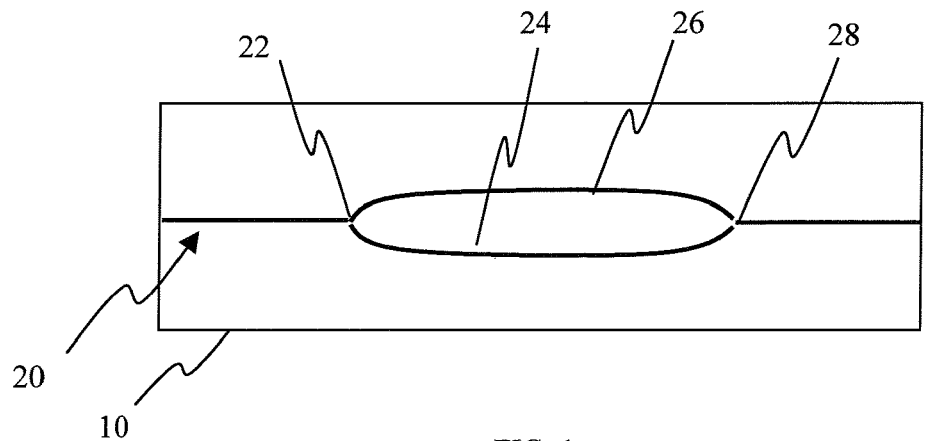
FIG. 1a is a schematic diagram of a prior art Mach-Zehnder optical modulator, illustrating a common optical waveguide configuration.
Figure 1B:
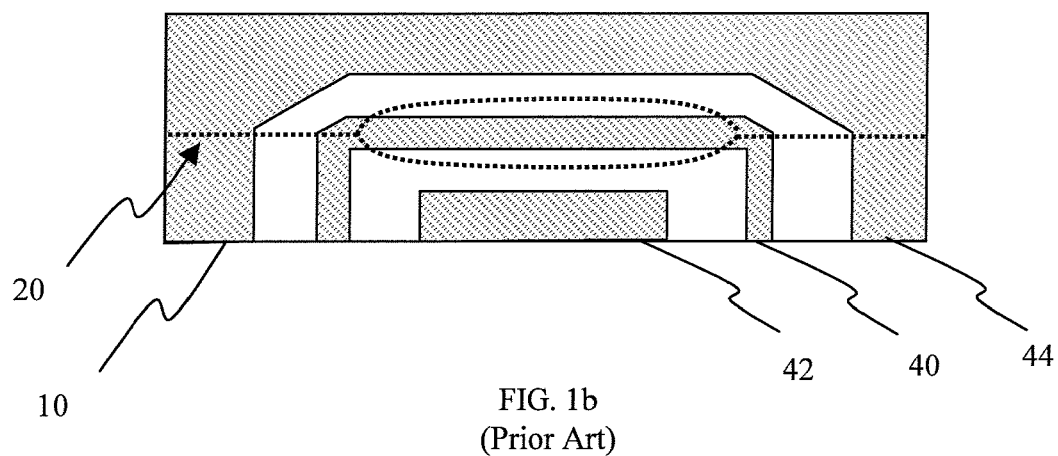
FIG. 1b is a schematic diagram of a prior art Mach-Zehnder optical modulator, illustrating a common electrode configuration for X-cut $LiNbO_3$.
Figure 1C:
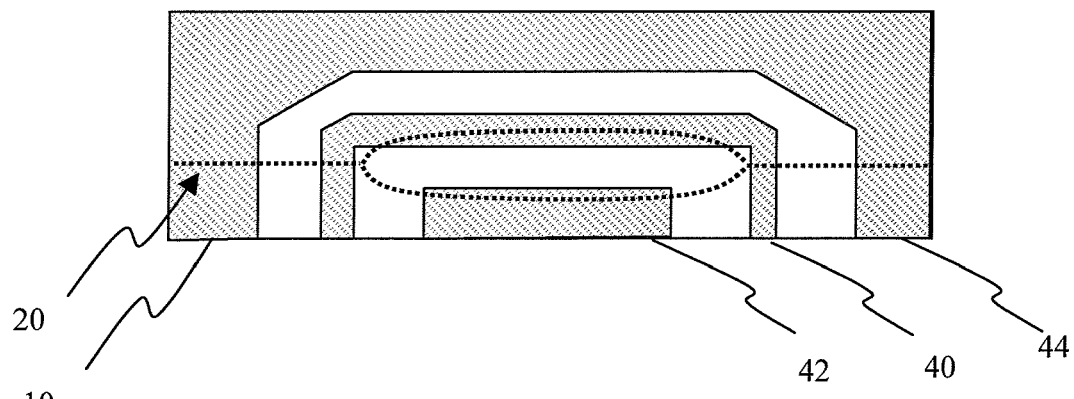
FIG. 1c is a schematic diagram of a prior art Mach-Zehnder optical modulator, illustrating a common electrode configuration for Z-cut $LiNbO_3$.
Figure 1D:
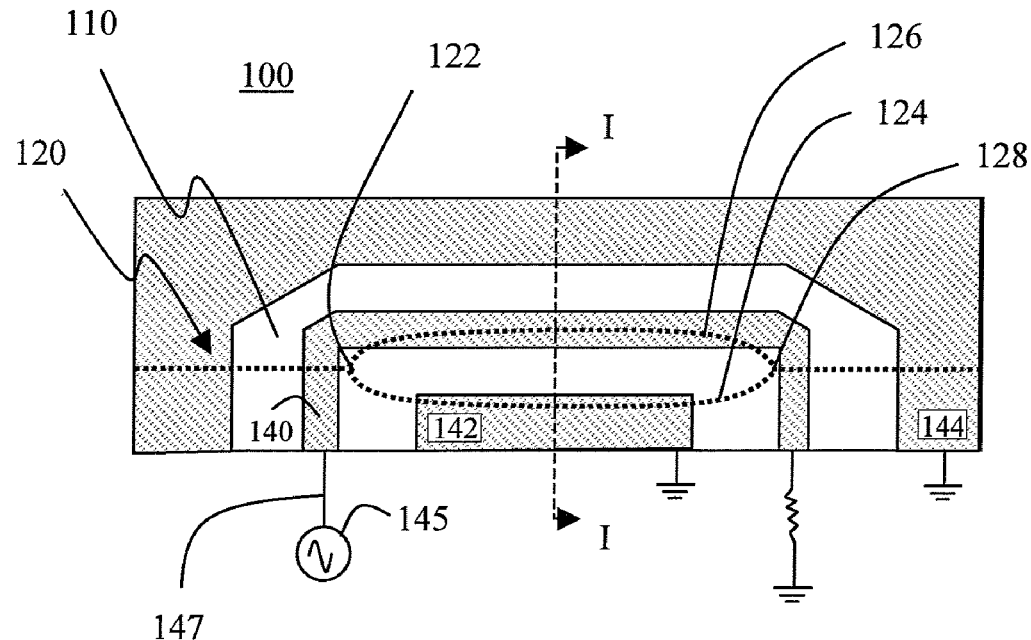
FIG. 1d is a plan view of a prior art Mach-Zehnder optical modulator having a Z-cut $LiNbO_3$ substrate.
Figure 1E:
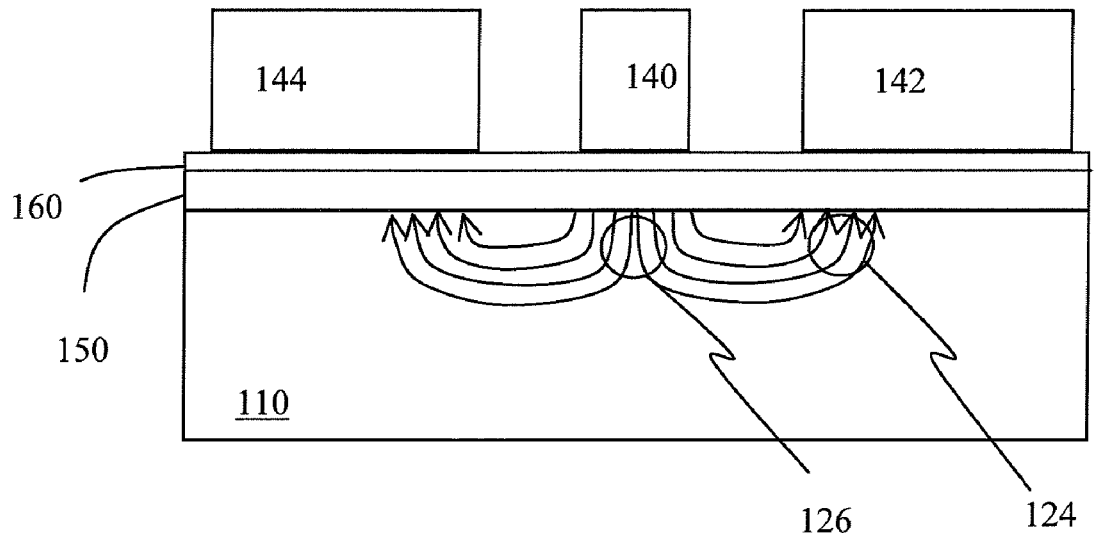
FIG. 1e is a sectional view of the prior art Mach-Zehnder optical modulator illustrated in FIG. 1d taken along line I-I.
Figure 2:
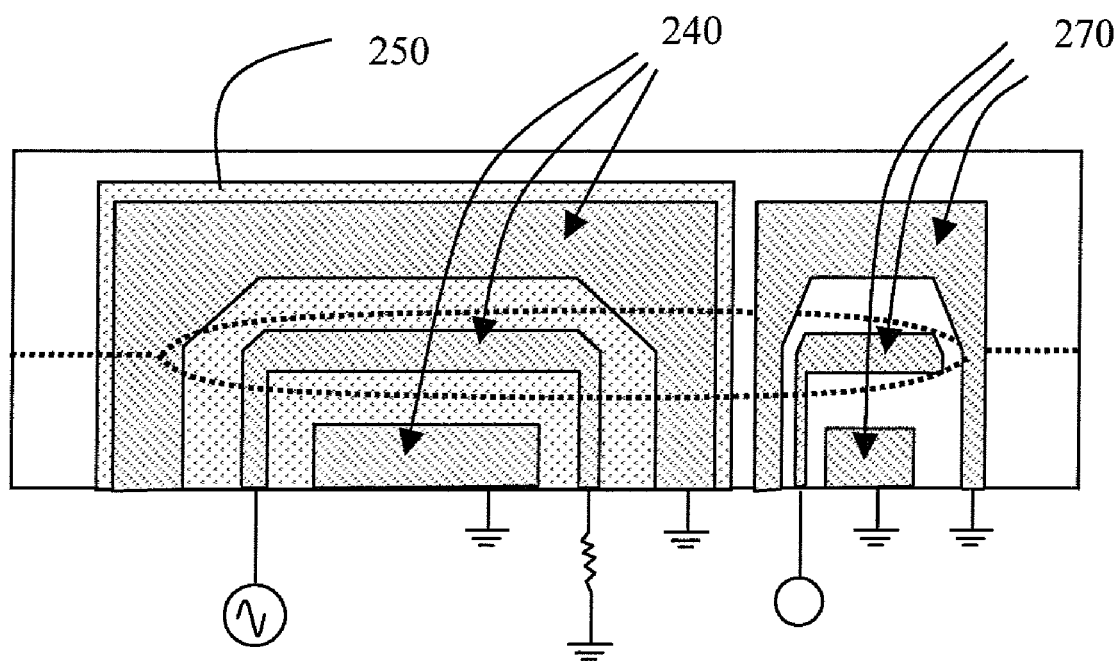
FIG. 2 is a plan view of a prior art low bias drift Mach-Zehnder optical modulator having an X-cut $LiNbO_3$ substrate.
Figure 3A:
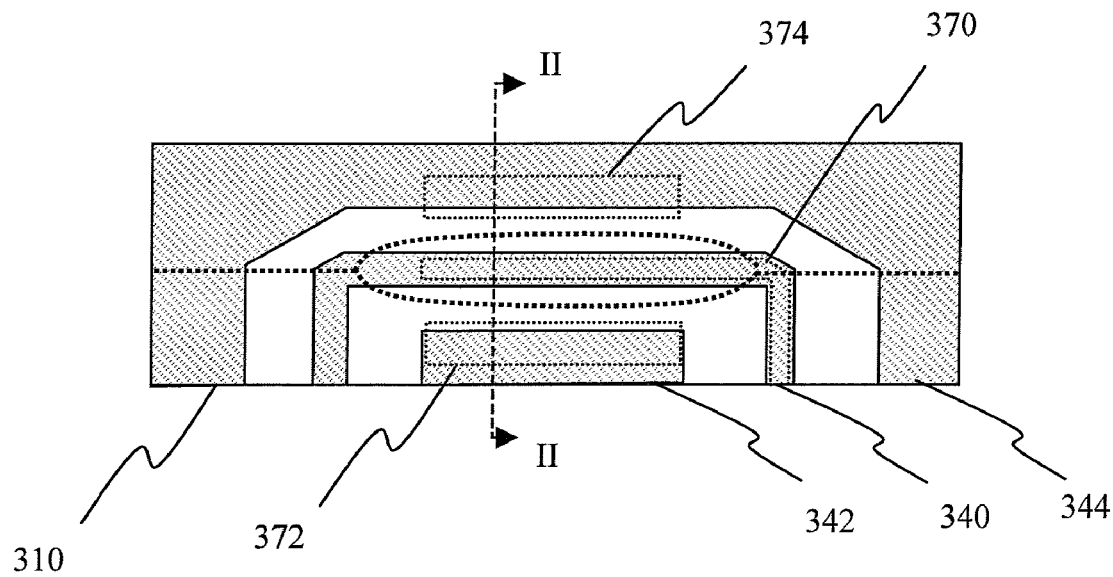
FIG. 3a is a plan view of another prior art low bias drift Mach-Zehnder optical modulator having an X-cut $LiNbO_3$ substrate.
Figure 3B:
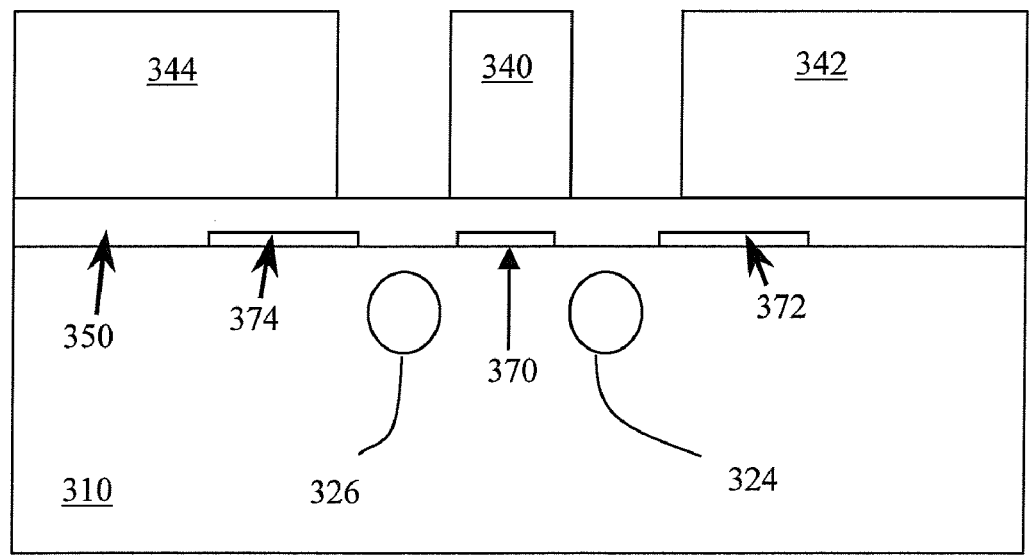
FIG. 3b is a sectional view of the prior art Mach-Zehnder optical modulator illustrated in FIG. 3a taken along line II-II.
Figure 4A:
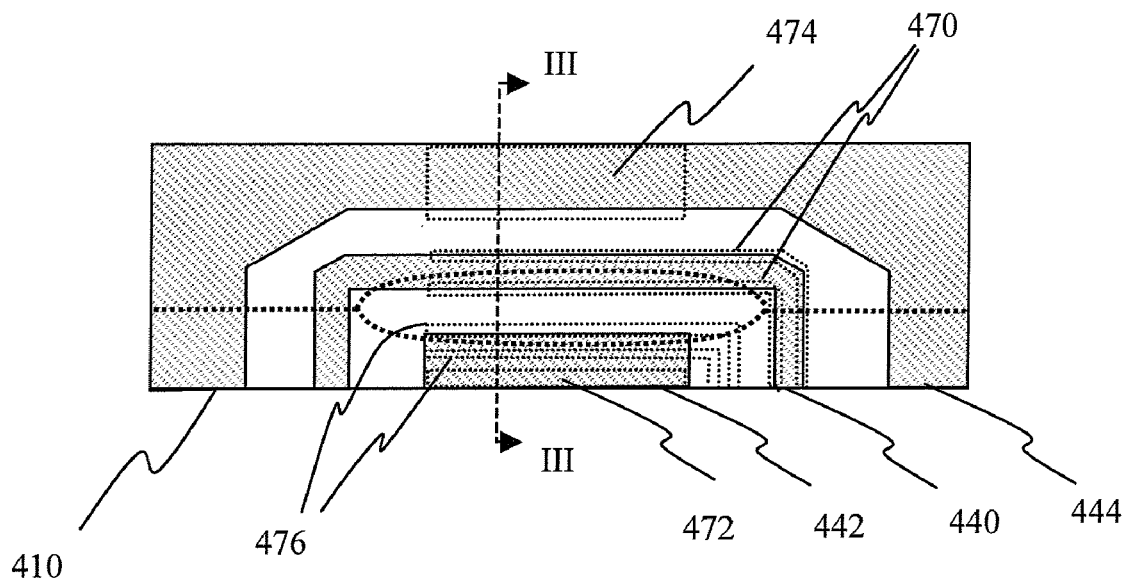
FIG. 4a is a plan view of a prior art low bias drift Mach-Zehnder optical modulator having a Z-cut $LiNbO_3$ substrate.
Figure 4B:
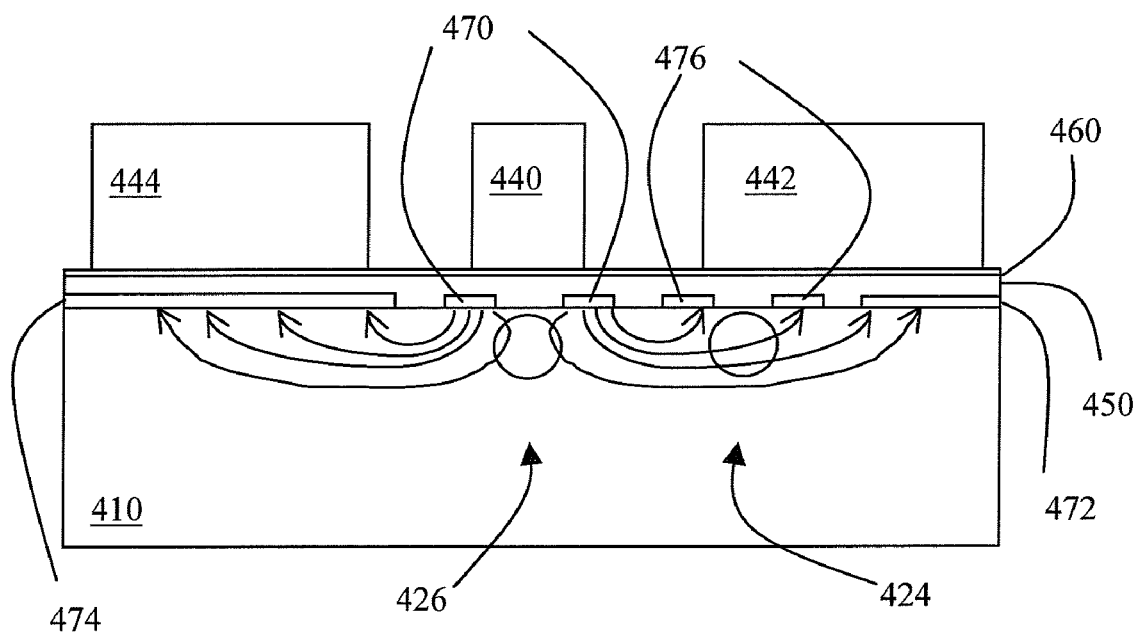
FIG. 4b is a sectional view of the prior art Mach-Zehnder optical modulator illustrated in FIG. 4a taken along line III-III.
Figure 5A:
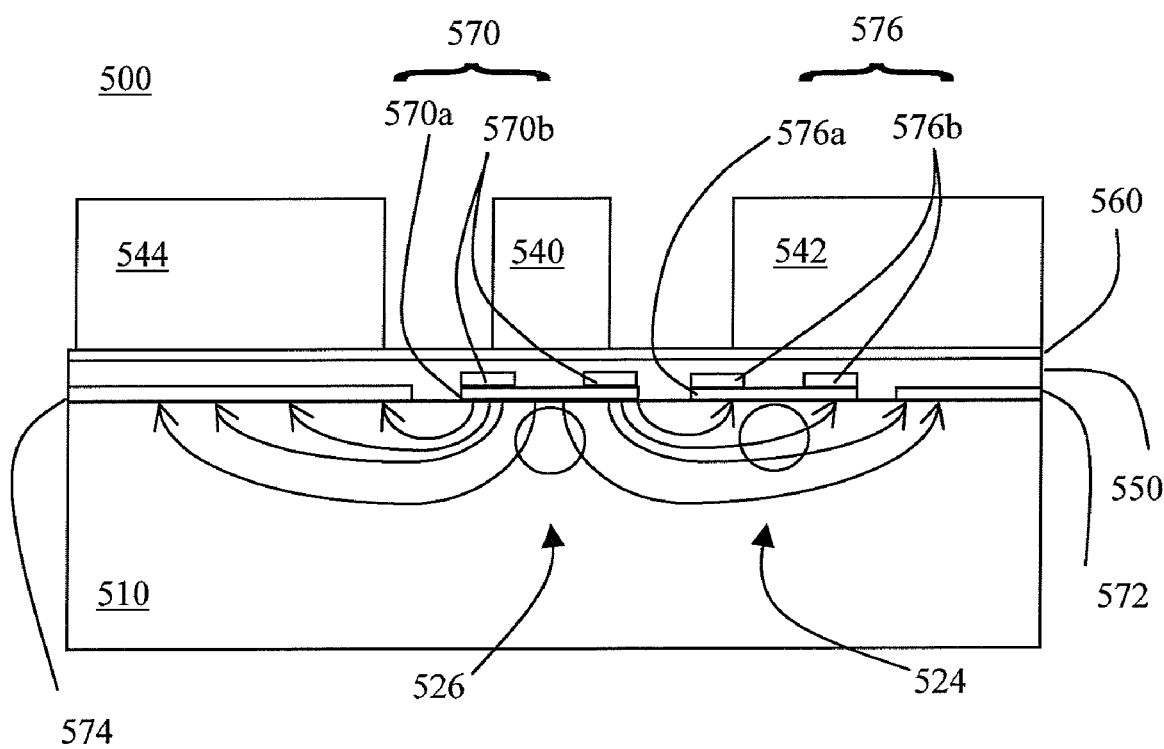
FIG. 5a is a sectional view of an electro-optic device in accordance with one embodiment of the instant invention.

Referring to FIG. 5a, there is shown a sectional view of an electro-optic device in accordance with one embodiment of the instant invention. The electro-optic device 500 includes a substrate 510, first 524 and second 526 optical waveguides, an RF signal electrode 540, RF ground electrodes 542, 544, a buffer layer 550, a bleed layer 560, first 570 and second 576 bias signal electrodes, and bias ground electrodes 572, 574.

In this embodiment, the substrate 510 is fabricated from an electro-optic material such as Z-cut lithium niobate (LiNbO$_3$). Alternatively, the substrate is fabricated from another electro-optic material, such as Z-cut lithium tantalite (LiTaO$_3$). The width, length, and thickness of the substrate 510 typically vary with the type of electro-optic device. For example, substrates for conventional Mach-Zehnder modulators are often about 40 mm long, 2 mm wide, and 1 mm thick. Of course, other dimensions are also possible.

The first 524 and second 526 optical waveguides are embedded in, or otherwise supported by, the substrate 510. The optical waveguides 524, 526 may be fabricated using one of various well-known methods, such as titanium diffusion or annealed proton exchange. For example, in one embodiment the waveguides 524, 526 are formed by patterning titanium in or on a Z-cut LiNbO$_3$ substrate, followed by subjecting the substrate to increased temperatures to allow the titanium to diffuse therein. Conventionally, titanium diffused waveguides in LiNbO$_3$ are about 7 µm wide and about 3 µm deep. The pattern used to form the waveguides 524, 526 is dependent on the type of electro-optic device. For example, if the electro-optic device is a Mach-Zehnder modulator, the pattern may be similar to that illustrated in FIG. 5b. Alternatively, if the electro-optic device is an optical switch or a tunable directional coupler, the pattern may be similar to that illustrated in FIG. 5c or 5d, respectively. Further alternatively, the pattern may correspond to another electro-optic device having two substantially parallel waveguides or waveguide segments. In each case, the sectional view along any of lines A-A would correspond to FIG. 5a. Notably, FIGS. 5b, 5c, and 5d only show the waveguide patterns (dotted lines) and an exemplary RF electrode structure (thatched structure) to simplify the illustrations (e.g., the buffer layer and/or bias electrodes are omitted from the figures).

Figure 5B:
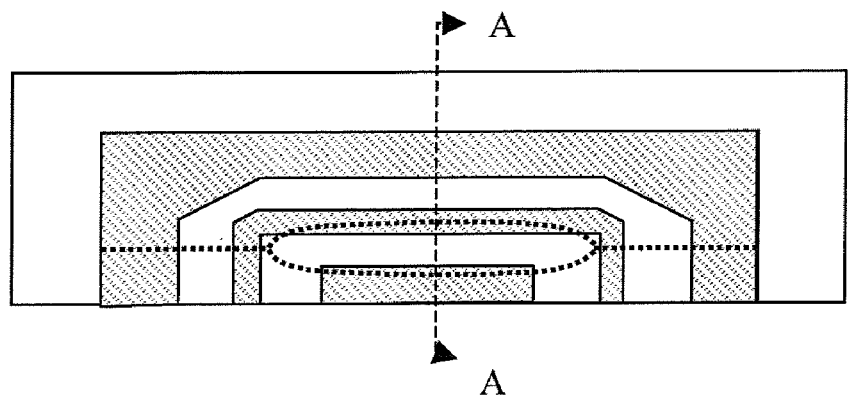
FIG. 5b is a plan view of the electro-optic device in FIG. 5a illustrating an embodiment where the optical waveguides are patterned to form a Mach-Zehnder interferometer.
Figure 5C:
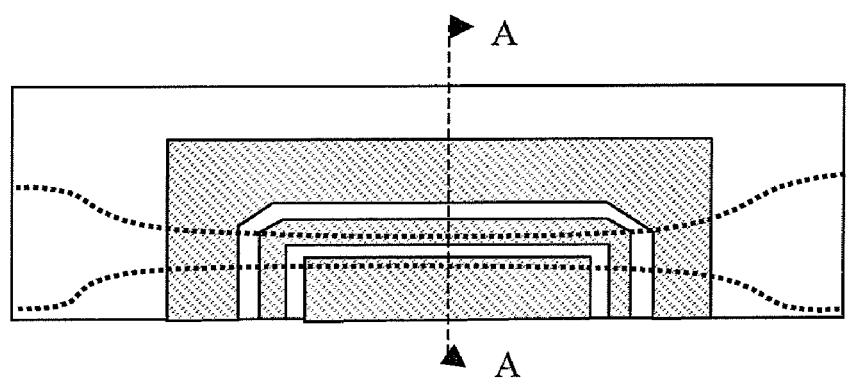
FIG. 5c is a plan view of the electro-optic device in FIG. 5a illustrating an embodiment where the optical waveguides are patterned to form a 2×2 optical switch.
Figure 5D:
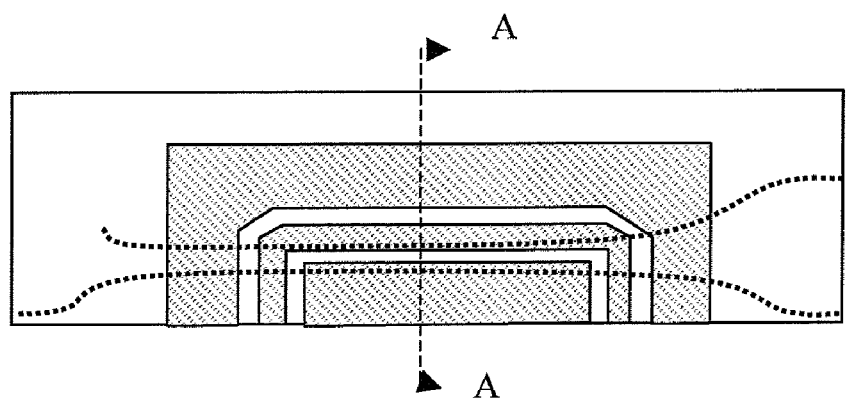
FIG. 5d is a plan view of the electro-optic device in FIG. 5a illustrating an embodiment where the optical waveguides are patterned to form an optical coupler.

The RF signal electrode 540 and the RF ground electrodes 544, 542 are supported by an substrate 510. The RF electrodes 540, 542, 544 are part of an RF electrode structure used to apply a high-frequency RF voltage across the waveguides 524, 526. For example, in one embodiment the RF electrode structure forms a traveling-wave electrode structure used to propagate a microwave signal that generates oppositely oriented electric fields in the first 524 and second 526 optical waveguides. The RF signal electrode 540 and RF ground electrode 542 are positioned substantially over the waveguides 526, 524, respectively. The RF electrodes 540, 542, 544 are typically formed from a material that exhibits high electrical conductivity such as gold (Au), copper (Cu), silver (Ag), or platinum (Pt). Since these metals do not always readily adhere to conventional bleed layer materials, an adhesion layer is optionally used to promote adhesion. Some examples of suitable adhesion layers include thin film layers of chromium (Cr), titanium (Ti), titanium-tungsten (Ti/W), etc. Alternatively, the adhesion layer is formed from a metal that has a work function similar to the RF electrode material (e.g., nickel (Ni) has a work function similar to that of Au). As discussed above, a matched work function assures that little if any voltage potential arises across the two metals, thus reducing galvanic corrosion. Alternatively, the adhesion layer is encapsulated as described in US Patent Application Publication No. 2003/0062551, or eliminated as described in U.S. Pat. No. 6,867,134, by activating the surface. While the RF electrode structures illustrated in FIGS. 5b, 5c, 5d, show one example of a suitable electrode design (e.g., known as coplanar waveguide), other designs are also possible (e.g., conventional coplanar strip, asymmetric coplanar strip, etc.). The RF electrode structure 540, 542, 544, which in one embodiment is about 15-40 µm high, may be fabricated using one of various well-known methods, such as electroplating, sputtering, evaporation, plasma etching, liftoff, etc.

The buffer layer 550 is provided to reduce optical losses due to absorption from the RF electrodes and to provide velocity matching between the optical signal and the RF signal. Accordingly, the buffer layer 550 is typically fabricated with a material that is optically transparent in the wavelength of interest (e.g., 1.55 microns) and has a dielectric constant that is lower than the dielectric constant of the substrate 510. For example, in one embodiment the buffer layer 550 is fabricated with silicon dioxide (SiO$_2$). In another embodiment, the buffer layer 550 is fabricated with benzocyclobutene (BCB). In general, the resistivity of the buffer layer 550 will be in the range from about $10^{17}$-$10^{19}$ Ω-cm @25° C., but could be higher. Using a substantially non-conductive material also allows the buffer layer 550 to provide electrical insulation between the bias signal electrodes and/or between the bias signal electrodes and the RF signal electrode. The buffer layer 550 is typically fabricated using one of various well-known methods, such vacuum deposition, ion-assist vacuum deposition, sputtering, or chemical vapor deposition (CVD). In one embodiment, the buffer layer 550 is planarized throughout the wafer. In another embodiment, the buffer layer 550 is patterned so as to cover only the bias electrode structure. In yet another embodiment, the buffer layer 550 is patterned to cover only the bias signal electrodes. The thickness of the buffer layer 550 is typically in the range between about 0.05 and 2 µm, and more commonly between about 0.4 and 1 µm. Notably, conventional SiO$_2$ buffer layers are often subject to an annealing step after deposition. Optionally, this annealing step is eliminated to prevent damage to the underlying bias electrode.

The bleed layer 560 is used to bleed off electric charge created by the pyroelectric effect. Accordingly, the bleed layer 560, which is used to dissipate the accumulated electric charge, is typically formed from an electrically conductive film. Preferably, the film is formed from a semiconductor to prevent shorting out the RF electrodes. Some examples of suitable materials for the slightly conductive film 560 include tantalum silicon nitride (TaSiN), titanium silicon nitride (TiSiN), silicon titanium oxynitride (SiTiON), amorphous or polycrystalline silicon (Si), etc. Conveniently, when the bleed layer 560 is formed from TaSiN, the highly resistive bleed layer also serves as a moisture barrier that prevents impurities from entering the buffer layer and/or prevents voltage induced ion migration near the bias electrodes. Accordingly, the electro-optical device could be described as a humidity tolerant and/or atmospheric tolerant electro-optic device. In addition, when the bleed layer 560 is formed from TaSiN, the RF electrodes may be deposited directly on the bleed layer (i.e., in the absence of an adhesion layer or an activated surface), thus simplifying the manufacturing process and further improving humidity tolerance. Note that the term TaSiN, as used herein, corresponds to a chemical composition that may be complex, and that is not necessarily represented by the 1:1:1 ratio suggested in the abbreviated chemical name (e.g., the actual formula may be more accurately represented by $Ta_xSi_yN_z$). The bleed layer 560 is typically fabricated using one of various well-known methods, such as vacuum deposition, ion-assist vacuum deposition, sputtering, or chemical vapor deposition (CVD). The thickness of the bleed layer 560 is typically in the range between about 0.05 and 0.5 µm, and more commonly between about 0.05 and 0.25 µm.

The first bias signal electrode 570, the second bias signal electrode 576, the first bias ground electrode 574, and the second bias ground electrode 572, are all supported by the substrate 510. The bias electrodes 570, 572, 574, 576 are part of the bias electrode structure used to apply a low-frequency or DC voltage across the optical waveguides.

The bias electrodes 570, 572, 574, 576 are typically formed from high-resistivity materials, such as tantalum silicon nitride (TaSiN), titanium silicon nitride (TiSiN), silicon titanium oxynitride (SiTiON), amorphous silicon (Si), indium oxide ($In_2O_3$), tin oxide ($SnO_2$), zinc oxide (ZnO), etc. Using high resistivity materials allows the bias signal electrode structure 570, 572, 574, 576 to be conductive at low frequencies and to function as a dielectric at high-frequencies. Accordingly, the bias signal electrodes 570, 572, 574, 576 are effectively transparent to the electric field generated by the RF electrode structure.

Each of the bias signal electrodes 570, 576 includes a lower portion 570a, 576a and an upper split portion 570b, 576b, respectively. The lower portions 570a, 576a are formed from strips of material that are aligned with the optical waveguides 526, 524, respectively. The upper split portions 570b, 576b are disposed on the lower portions 570a, 576a, respectively. Each upper split portion 570b, 576b includes two elongated segments that run substantially parallel to, but are staggered relative to, the corresponding waveguide segment.

Suitable resistivity values for the upper split portion 570b, 576b of the bias electrode lie between that of the RF electrode material and that of the substrate. For example, when x≈1, y≈1, and z≈1, $Ta_xSi_yN_z$ typically has a resistivity in the range of about $10^4$ to $10^6$ Ω-cm @25° C., which is between ~2.3× $10^{-6}$ Ω-cm @25° C. (Au) and ~1.3×$10^{17}$ Ω-cm @25° C. ($LiNbO_3$). Preferably, the resistivity of the bias electrode material for the upper split portion is in the range from about 1 to $10^8$ ohm-cm (Ω-cm) @25° C., more preferably from about $10^2$ to $10^7$ ohm-cm (Ω-cm) @25° C., and most preferably from about $10^4$ to $10^6$ ohm-cm (Ω-cm) @25° C.

The lower portions 570a, 576a are fabricated from a material having a higher resistivity than the material used to form the upper split portions 570b, 576b. Accordingly, the material used to form the lower portions 570a, 576a may be referred to as an ultra-high resistivity material for explanatory purposes. In general, the ultra-high resistivity material will be sufficiently conductive to allow the lower portions to function as part of the bias signal electrodes 570, 576, and to significantly contribute to the DC electric field.

For example, in one embodiment, the upper portions 570b, 576b are formed from a high resistivity TaSiN layer having a resistivity in the range from about $10^4$ to $10^6$ Ω-cm @25° C., whereas the lower portions 570a, 576a are formed from an ultra-high resistivity TaSiN layer having a resistivity in the range from about $10^6$ to $10^{10}$ Ω-cm @25° C. As will be understood by those skill in the art, the difference in resistivity between the two TaSiN layers may be achieved by changing the ratio of Ta:Si:N, with increased amounts of Ta generally providing a lower resistivity. Alternatively, the difference in resistivity between the two TaSiN layers is achieved by varying the partial pressure of nitrogen (e.g., in a $N_2$/Ar mixture) during sputtering. For example, in one embodiment, the lower portion is sputter deposited with a higher nitrogen partial pressure (e.g., 1.8 mTorr nitrogen partial pressure in the total pressure of 12.5 mTorr), while the upper portion is sputter deposited with a lower nitrogen pressure (e.g., 0.6 mTorr nitrogen partial pressure in the total pressure of 12.5 mTorr).

In general, the upper limit on the resistivity of the lower portions 570a, 576a is related to the upper limit of the resistivity of the upper portion 570b, 576b. The upper limit to the ratio of the two resistivities is determined by the bias electrode geometry. In order for the lower portion to enhance the bias electrode modulation produced by the upper portion, the series resistance introduced by the lower portion should be comparable to, or less than, the series resistance introduced by the upper portion. If the series resistance introduced by the lower portions 570a, 576a is much larger than that introduced by the upper portions 570b, 576b, there may still be enhancement of modulation by the lower portions 570a, 576a, but most likely on a time scale much longer than the response time associated with the upper portions 570b, 576b. For example, if the series resistance of the lower portion is high compared to the lower portion, response to a bias signal with frequency components above 1 Hz may not be improved by the conductivity of the lower portion. However, bias drift on the order of hours or longer may be reduced.

The series resistance of a conductor is given by the simple formula $$R = \frac{\rho L}{tW} \quad (1)$$

where ρ is the bulk resistivity, L is the length, t is the thickness, and W is the width. Hence, for the upper portions 570b, 576b, the series resistance is given by $$R_{upper} = \frac{\rho_{upper} L}{t_{upper} W} \quad (2)$$

where $\rho_{upper}$, t, L, and W are the bulk resistivity, thickness, length, and width of one strip of the upper portion, respectively. The series resistance of the lower portions 570a, 576a is quite different, as the conduction currents are traveling laterally (perpendicular to the waveguide), rather than longitudinally (along the length of the waveguide). Hence, series resistance for each of the lower portions 570a, 576a is given by $$R_{lower} = \frac{\rho_{lower} Gap}{t_{lower} L} \quad (3)$$

where Gap is the gap between the two strips forming the upper portion of the bias electrode, and L is the length (along the waveguide) of the bias electrode segment. Hence, Gap and L correspond to the length and width, respectively, of the lower portion series resistor. The ratio of the two series resistances is simply $$\text{Ratio} = \frac{R_{lower}}{R_{upper}} = \frac{\rho_{lower}}{\rho_{upper}} \frac{t_{upper}}{t_{lower}} \frac{W Gap}{L^2} \quad (4)$$

Preferably, this ratio is on the order of one or less if the lower portions 570a, 576a are to contribute to the modulation on the same time scale as the upper portions 570b, 576b. This statement holds true assuming that the bias electrode capacitance between bias signal and bias ground electrodes is the same for both upper and lower portions. Note that the capacitance for the lower portion may actually be higher due to the larger surface area of the lower portion compared to the upper portion, resulting in an even larger time constant for the lower portion relative to upper portion. However, Equation 4 still provides guidance as to the upper limit to the resistivity of the lower portions. In addition, Equation 4 also provides guidance as to the lower limit of the thickness of the lower portions. For example, if W and Gap are both 10 μm, and L is 1 mm, and the thicknesses of upper and lower portion are the same, then the resistivity of the lower portion must be about no more than 10,000 times that of the upper portion. Alternatively, if both upper and lower portions are made of the same material, hence have the same resistivity, and the upper portion is 0.25 μm thick, then the lower portion must be at least 0.25 Angstroms thick, an easy constraint to meet, as even a single atomic layer of any material is likely to be a few Angstroms thick.

The high resistivity material(s) used in each of the bias electrodes 570, 572, 574, 576 may include the same material used to form the bleed layer 560, or a different material. Conveniently, when they include the same material (e.g., TaSiN), the fabrication process is relatively simple. The bias electrode material(s) may be deposited using one of various well-known methods, including vacuum deposition and sputtering. The thickness of the upper high resistivity layer is typically in the range between about 0.05 and 0.5 μm, and more commonly between about 0.05 and 0.25 μm. The thickness of the lower ultra-high resistivity layer is also typically in the range between about 0.05 and 0.5 μm, and more commonly between about 0.05 and 0.25 μm.

Advantageously, since the upper 570b, 576b and lower 570a, 576a portions of the bias signal electrodes are formed from high resistivity materials, the RF signal will be less likely to couple with bias electrodes, and the net RF loss per unit length of the RF signal electrode will decrease.

Further advantageously, since materials with higher resistivity values often exhibit increased optical transparency relative to materials having a low resistivity value, the ultra-high resistivity material should be relatively transparent at optical frequencies. In addition, since the optically transparent lower portions are disposed directly over the waveguides, they can improve bias electrode modulation efficiency in response to a DC voltage, and serve as a spacer, thereby minimizing optical loss due to the less transparent upper portions. Optical loss is further reduced since the elongated segments of each upper portion are shifted laterally with respect to the center of the corresponding waveguide.

As discussed above, increasing the resistivity of the bias electrode material(s) minimizes coupling with the RF electrodes and/or increases optical transparency. Unfortunately, if the resistivity of the bias electrode material(s) is too high the bias electrode response time will increase and/or the series resistance of the bias electrodes will be too high. For example, it is well known in the art that narrow strip electrodes formed of a very high resistivity material typically exhibit a high series resistance, and hence a long time constant.

In this embodiment, the benefits of using an ultra-high resistivity material as part of the bias electrodes are realized, without a significant increase in series resistance. In particular, the series resistance is not excessively high because the bias signal does not need to travel the entire length of the ultra-high resistivity lower portions. For example, while the bias signal will need to travel the length of the high resistivity upper portion (e.g., which is typically about 1 mm long in segmented embodiments), it will only need to travel the width of the ultra-high resistivity lower portion (e.g., which is typically about 20 μm or less). Since the bias signal does not need to travel far in the lower portion, the ultra-high material can advantageously be selected to optimize optical transparency and RF transparency, with less consideration for reducing series resistance and/or response times.

Figure 6:
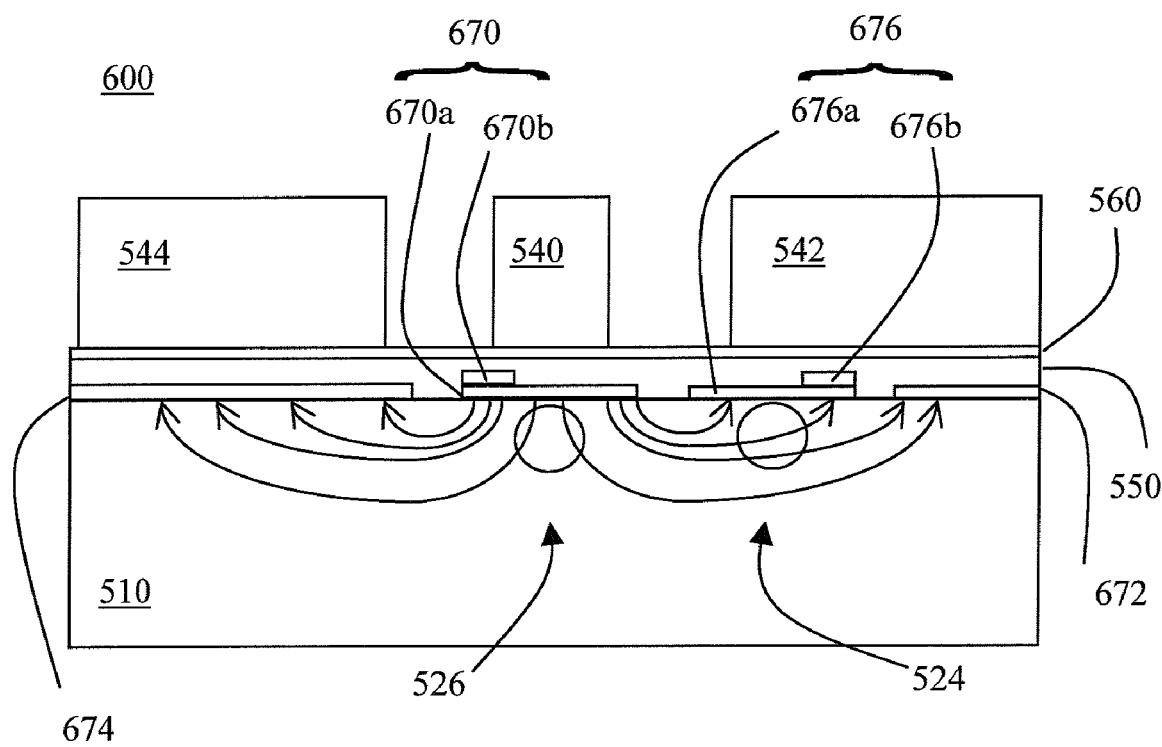
FIG. 6 is a sectional view of an electro-optic device in accordance with another embodiment of the instant invention.

Referring to FIG. 6, there is shown a sectional view of an electro-optic device in accordance with other embodiment of the instant invention. The electro-optic device 600 includes a substrate 510, first 524 and second 526 optical waveguides, an RF signal electrode 540, RF ground electrodes 542, 544, a buffer layer 550, a bleed layer 560, first 670 and second 676 bias signal electrodes, and bias ground electrodes 672, 674.

The substrate 510, first 524 and second 526 optical waveguides, RF signal electrode 540, RF ground electrodes 542, 544, buffer layer 550, and bleed layer 560, are as described above.

The first bias signal electrode 670, the second bias signal electrode 676, the first bias ground electrode 674, and the second bias ground electrode 672, are all supported by the substrate 610. The bias electrodes 670, 672, 674, 676 are part of the bias electrode structure used to apply a low-frequency or DC voltage across the optical waveguides.

The bias electrodes 670, 672, 674, 676 are typically formed from high-resistivity materials, such as tantalum silicon nitride (TaSiN), titanium silicon nitride (TiSiN), silicon titanium oxynitride (SiTiON), amorphous silicon (Si), indium oxide ($In_2O_3$), tin oxide ($SnO_2$), zinc oxide (ZnO), etc. Using high resistivity materials allows the bias signal electrode structure 670, 672, 674, 676 to be conductive at low frequencies and to function as a dielectric at high-frequencies. Accordingly, the bias signal electrodes 670, 672, 674, 676 are effectively transparent to the electric field generated by the RF electrode structure.

Each of the bias signal electrodes 670, 676 includes a lower portion 670a, 676a and an upper portion 670b, 676b, respectively. The lower portions 670a, 676a are formed from strips of material that are aligned with the optical waveguides 526, 524, respectively. The upper portions 670b, 676b are disposed on the lower portions 670a, 676a, respectively. Each upper portion 670b, 676b includes an elongated segment that runs substantially parallel to, but is shifted laterally to one side of the corresponding waveguide segment 526, 524, respectively. Since one half of the upper portion is eliminated, relative to the embodiment illustrated in FIG. 5a, the bias electrodes are less likely to load the optical waveguide.

Suitable resistivity values for the upper portion 670b, 676b, of the bias electrode lie between that of the RF electrode material and that of the substrate. For example, when x≈1, y≈1, and z≈1, $Ta_xSi_yN_z$ typically has a resistivity in the range of about $10^4$ to $10^6$ Ω-cm @25° C., which is between ~2.3×$10^{-6}$ Ω-cm @25° C. (Au) and ~1.3×$10^{17}$ Ω-cm @25° C. (LiNbO$_3$). Preferably, the resistivity of the bias electrode materials for the upper split portion is in the range from about 1 to $10^8$ ohm-cm (Ω-cm) @25° C., more preferably from about $10^2$ to $10^7$ ohm-cm (Ω-cm) @25° C., and most preferably from about $10^4$ to $10^6$ ohm-cm (Ω-cm) @25° C.

The lower portions 670a, 676a are fabricated from a material having a higher resistivity than the material used to form the upper portions 670b, 676b, Accordingly, the material used to form the lower portions 670a, 676a may be referred to as an ultra-high resistivity material for explanatory purposes. In general, this ultra-high resistivity material will be sufficiently conductive to allow the lower portions to function as part of the bias signal electrodes 670, 676, and to significantly contribute to the DC electric field.

For example, in one embodiment, the upper portions 670b, 676b are formed from a high resistivity TaSiN layer having a resistivity in the range from about $10^4$ to $10^6$ Ω-cm @25° C., whereas the lower portions 670a, 676a are formed from an ultra-high resistivity TaSiN layer having a resistivity in the range from about $10^6$ to $10^{10}$ Ω-cm @25° C. As will be understood by those skill in the art, the difference in resistivity between the two TaSiN layers may be achieved by changing the ratio of Ta:Si:N, with increased amounts of Ta generally providing a lower resistivity. Alternatively, the difference in resistivity between the two TaSiN layers is achieved by varying the partial pressure of nitrogen (e.g., in a $N_2$/Ar mixture) during sputtering. For example, in one embodiment, the lower portion is sputter deposited with a higher nitrogen partial pressure (e.g., 1.8 mTorr nitrogen partial pressure in the total pressure of 12.5 mTorr), while the upper portion is sputter deposited with a lower nitrogen pressure (e.g., 0.6 mTorr nitrogen partial pressure in the total pressure of 12.5 mTorr). As discussed above, the upper limit on the resistivity of the lower portions 670a, 676a is typically related to the upper limit of the resistivity of the upper portion 670b, 676b.

The high resistivity material(s) used in each of the bias electrodes 670, 672, 674, 676 may include the same material used to form the bleed layer 660, or a different material. Conveniently, when they include the same material (e.g., TaSiN), the fabrication process is relatively simple. The bias electrode material(s) may be deposited using one of various well-known methods, including vacuum deposition and sputtering. The thickness of the upper high resistivity layer is typically in the range between about 0.05 and 0.5 μm, and more commonly between about 0.05 and 0.25 μm. The thickness of the lower ultra-high resistivity layer is also typically in the range between about 0.05 and 0.5 μm, and more commonly between about 0.05 and 0.25 μm.

Advantageously, since the upper 670b, 676b and lower 670a, 676a portions of the bias signal electrodes are formed from high resistivity materials, the RF signal will be less likely to couple with bias electrodes, and the net RF loss per unit length of the RF signal electrode will decrease.

Further advantageously, since materials with higher resistivity values often exhibit increased optical transparency relative to materials having a low resistivity value, the ultra-high resistivity material should be relatively transparent at optical frequencies. In addition, since the optically transparent lower portions are disposed directly over the waveguides, they can improve bias electrode modulation efficiency in response to a DC voltage, and serve as a spacer, thereby minimizing optical loss due to the less transparent upper portions. Optical loss is further reduced since each upper portion is shifted laterally to one side of the corresponding waveguide.

As discussed above, increasing the resistivity of the bias electrode material(s) minimizes coupling with the RF electrodes and/or increases optical transparency. Unfortunately, if the resistivity of the bias electrode material(s) is too high the bias electrode response time will increase and/or the series resistance of the bias electrode will be too high. For example, it is well known in the art that narrow strip electrodes formed of a very high resistivity material will typically exhibit a high series resistance, and hence a long time constant.

In this embodiment, the benefits of using an ultra-high resistivity material as part of the bias electrode are realized, without a significant increase in series resistance. In particular, the series resistance is not excessively high because the bias signal does not need to travel the entire length of the ultra-high resistivity lower portion. For example, while the bias signal will need to travel the length of the high resistivity upper portion (e.g., which is typically up to about 1 mm long in segmented embodiments), it will only need to travel the width of the ultra-high resistivity lower portion (e.g., which is typically about 20 μm or less). Since the bias signal does not need to travel far in the lower portion, the ultra-high material can advantageously be selected to optimize optical transparency and RF transparency, with less consideration for reducing series resistance and/or response times.

In the embodiments described with reference to FIGS. 5a and 6, the lower portions are fabricated with a material having a higher resistivity than the material used to form the upper portions. Alternatively, or in addition, optical transparency and RF transparency is improved by making the lower portions of the bias electrodes in FIGS. 5a and 6 relatively thin.

Figure 7:
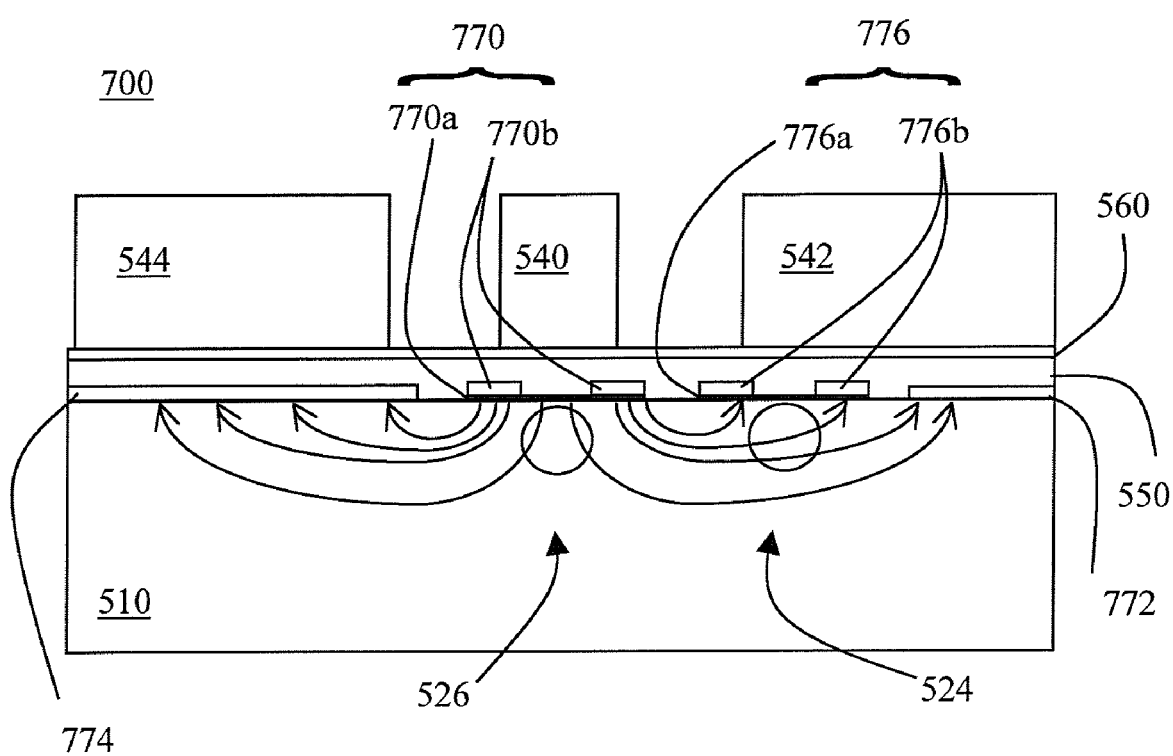
FIG. 7 is a sectional view of an electro-optic device in accordance with yet another embodiment of the instant invention.

Referring to FIG. 7, there is shown a sectional view of an electro-optic device in accordance with other embodiment of the instant invention. The electro-optic device 700 includes a substrate 510, first 524 and second 526 optical waveguides, an RF signal electrode 540, RF ground electrodes 542, 544, a buffer layer 550, a bleed layer 560, first 770 and second 776 bias signal electrodes, and bias ground electrodes 772, 774.

The substrate 510, first 524 and second 526 optical waveguides, RF signal electrode 540, RF ground electrodes 542, 544, buffer layer 550, and bleed layer 560, are as described above.

The first bias signal electrode 770, the second bias signal electrode 776, the first bias ground electrode 774, and the second bias ground electrode 772, are all supported by the substrate 510. The bias electrodes 770, 772, 774, 776 are part of the bias electrode structure used to apply a low-frequency or DC voltage across the optical waveguides.

The bias electrodes 770, 772, 774, 776 are typically formed from one or more high-resistivity materials such as tantalum silicon nitride (TaSiN), titanium silicon nitride (TiSiN), silicon titanium oxynitride (SiTiON), amorphous silicon (Si), indium oxide ($In_2O_3$), tin oxide ($SnO_2$), zinc oxide (ZnO), etc. Using high resistivity materials allows the bias signal electrode structure 770, 772, 774, 776 to be conductive at low frequencies and to function as a dielectric at high-frequencies. Accordingly, the bias signal electrodes 770, 772, 774, 776 are effectively transparent to the electric field generated by the RF electrode structure.

Each of the bias signal electrodes 770, 776 includes a lower portion 770a, 776a and an upper split portion 770b, 776b, respectively. The lower portions 770a, 776a are formed from strips of material that are aligned with the optical waveguides

526, 524, respectively. The upper split portions 770b, 776b are disposed on the lower portions 770a, 776a, respectively. Each upper split portion 770b, 776b includes two elongated segments that run substantially parallel to, but are staggered relative to, the corresponding waveguide segment. Alternatively, the right segment in the left split portion 770b and the left segment in the right split portion 776b are eliminated as illustrated in FIG. 6. Further alternatively, the right segment in the left split portion 770b and the right segment in the right split portion 776b are eliminated.

Suitable resistivity values for the upper and/or lower portions of the bias electrode lie between that of the RF electrode material and that of the substrate. For example, when $x \approx 1$, $y \approx 1$, and $z \approx 1$, $Ta_xSi_yN_z$ typically has a resistivity in the range of about $\sim 10^4$ to $10^6$ Ω-cm @25° C., which is between $2.3 \times 10^{-6}$ Ω-cm @25° C. (Au) and $\sim 1.3 \times 10^{17}$ Ω-cm @25° C. (LiNbO$_3$). Preferably, the resistivity of the bias electrode materials is in the range from about 1 to $10^8$ ohm-cm (Ω-cm) @25° C.

The lower portions 770a, 776a are fabricated to be much thinner than the upper portions 770b, 776b. Preferably, the lower portions 770a, 776a have a thickness that is less than about 0.15 μm, and more preferably less than about 0.015 μm (e.g., 150 Å). In comparison, it is preferred that the upper portions 770b, 776b have a thickness in the range between about 0.05 and 0.5 μm, and more preferably between about 0.05 and 0.25 μm. As discussed above, Equation 4 provides guidance as to the lower limit of the thickness of the lower portions.

The high resistivity material used to form the lower portions 670a, 676a may be the same material used to form the upper split portions 770b, 776b, or a different material. In addition, the high resistivity material used in each of the bias electrodes 770, 772, 774, 776 may be the same material used to form the bleed layer 560, or a different material. Conveniently, when the same material (e.g., TaSiN) is used to form the lower portions 670a, 676a, the upper split portions 770b, 776b, and the bleed layer 560, the fabrication process is relatively simple. The bias electrode material(s) may be deposited using one of various well-known methods, including vacuum deposition and sputtering.

For example, in one embodiment, the upper portions 770b, 776b are formed from a high resistivity TaSiN layer having a layer thickness of about 0.2 μm, whereas the lower portions 770a, 776a are formed from a high resistivity TaSiN layer having a thickness of about 100 Å.

Advantageously, since the upper 770b, 776b and lower 770a, 776a portions of the bias signal electrodes are formed from high resistivity materials, the RF signal will be less likely to couple with bias electrodes, and the net RF loss per unit length of the RF signal electrode will decrease. In addition, RF coupling is further reduced because the lower portions are relatively thin.

Further advantageously, since very thin layers exhibit increased optical transparency relative to thicker layers, the lower portions should be relatively transparent at optical frequencies. In addition, since the optically transparent lower portions are disposed directly over the waveguides, they can improve bias electrode modulation efficiency in response to a DC voltage, with out introducing significant optical loss. Since the elongated segments of each thicker upper portion are shifted laterally to opposite sides of the corresponding waveguide, optical loss is further reduced.

As discussed above, using a very thin high resistivity material minimizes coupling with the RF electrodes and/or increases optical transparency. Unfortunately, if the bias electrodes are too thin the series resistance of the bias electrode will be too high. For example, it is well known in the art that thin electrodes formed of a very high resistivity material will typically exhibit a high series resistance, and hence a long time constant.

In this embodiment, the benefits of using a very thin lower portion are realized, without a significant increase in series resistance. In particular, the series resistance is not excessively high because the bias signal does not need to travel the entire length of the very thin lower portion. For example, while the bias signal will need to travel the length of the high resistivity upper portion (e.g., which is typically up to about 1 mm long in segmented embodiments), it will only need to travel the width of the very thin lower portion (e.g., which is typically about 20 μm or less). Since the bias signal does not need to travel far in the lower portion, the thickness of the lower portion can be advantageously be selected to optimize optical transparency, with less consideration for reducing series resistance.

In another embodiment, the upper portions 770b, 776b are formed from a high resistivity TaSiN layer having a layer thickness of about 0.2 μm, whereas the lower portions 770a, 776a are formed from an optically transparent semiconductor layer (e.g., formed from In$_2$O$_3$) having a thickness of about 100 Å.

Advantageously, since the upper 770b, 776b and lower 770a, 776a portions of the bias signal electrodes are formed from high resistivity materials, the RF signal will be less likely to couple with bias electrodes, and the net RF loss per unit length of the RF signal electrode will decrease. In addition, RF coupling is further reduced because the lower portions are relatively thin. For example, although semiconductor materials such as In$_2$O$_3$, SnO$_2$, and ZnO are effectively transparent to the electric field generated by the RF electrode structure, they are less transparent to the RF signal than materials such as TaSiN. However, by reducing the thickness of these layers to 150 Å or less (e.g., to 80 Å), their RF transparency is significantly increased.

Further advantageously, since thin layers of semiconductor materials such as In$_2$O$_3$, SnO$_2$, and ZnO are substantially optically transparent, the lower portions can improve bias electrode modulation efficiency in response to a DC voltage without introducing significant optical loss. Since the elongated segments of each upper portion are shifted laterally to opposite sides of the corresponding waveguide, optical loss is further reduced.

According to one embodiment, the above described electro-optic devices 500/600/700 are fabricated by first depositing the lower portions of the bias electrode by vacuum deposition or sputtering, and patterned by etching or by using a "lift-off" process. The upper portions of the bias electrode are then also deposited by vacuum deposition or sputtering, and patterned by etching or by using a "lift-off" process. The lift-off process for patterning the upper portion is desirable as the lower portion is likely to be etched during patterning of the upper portion, if an etch process is used. The buffer and bleed layers, and gold electrode layers are deposited and patterned by well known methods known to one skilled in the art.

Figure 8:
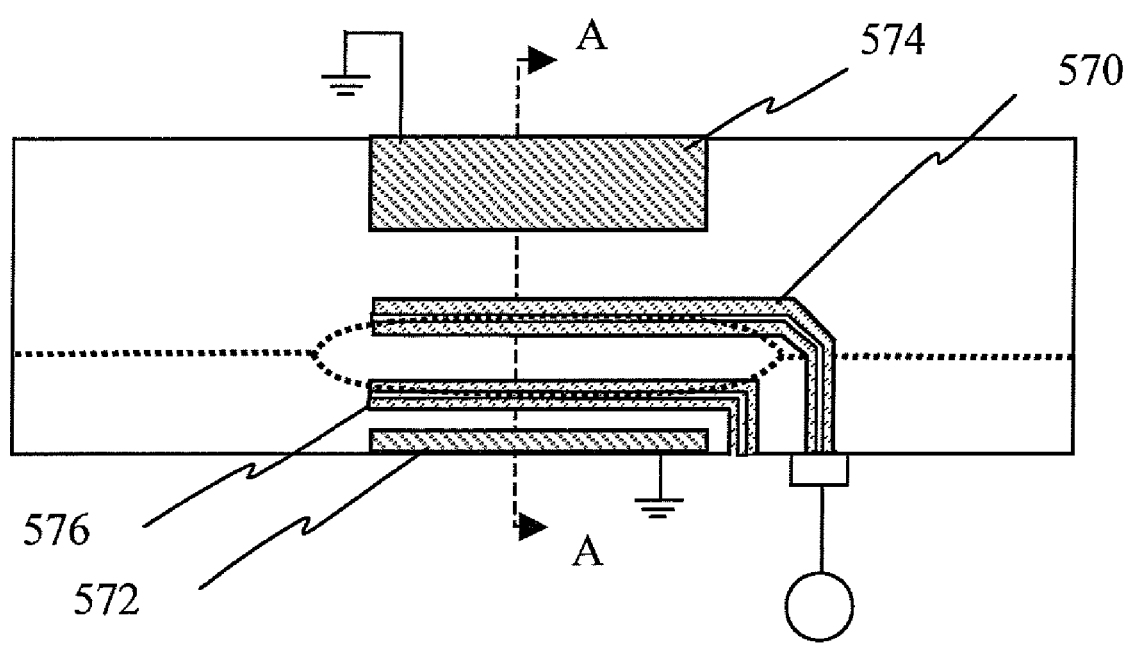
FIG. 8 is a plan view illustrating an embodiment where the bias electrode structure is substantially aligned with the RF electrode structure (not shown)
Figure 9A:
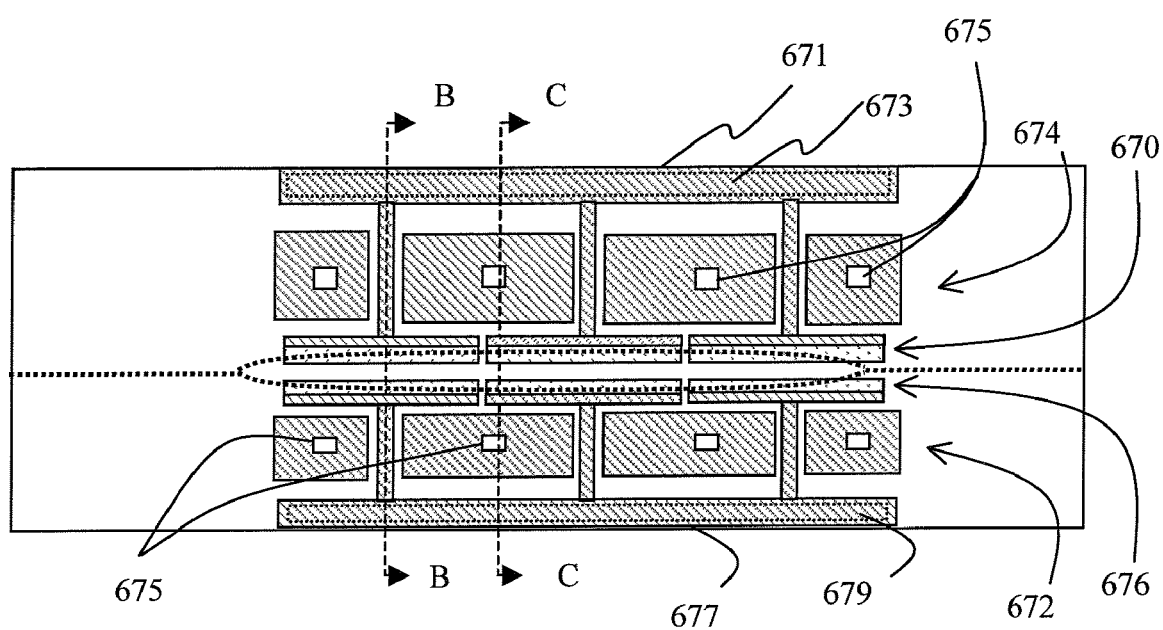
FIG. 9a is a plan view illustrating an embodiment where the bias electrode structure is segmented.
Figure 10:
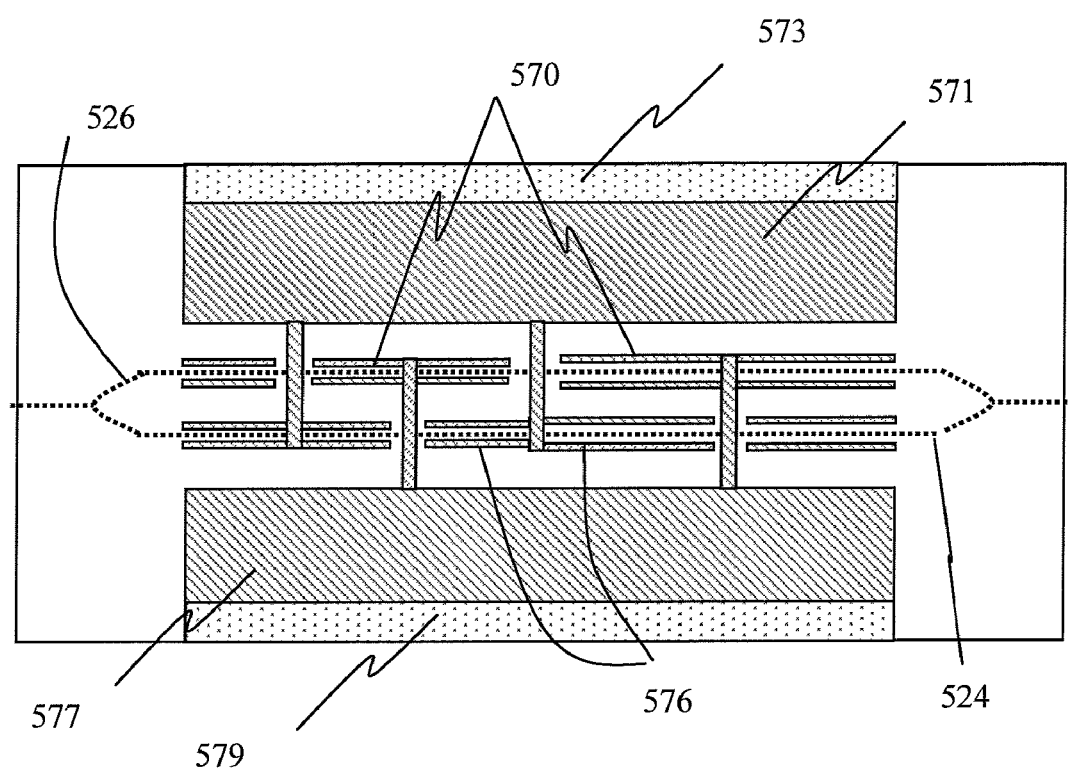
FIG. 10 is a plan view illustrating another embodiment where the bias electrode structure is segmented.

Referring to FIGS. 8, 9a,b,c, and 10, the bias signal electrodes may be continuous as illustrated in FIG. 8, or segmented as illustrated in FIGS. 9a,b,c and 10. For illustrative purposes the embodiments in FIGS. 8 and 10 are described using the electro-optic device 500 discussed with reference to FIG. 5a, while the embodiment in FIGS. 9a,b,c, is described using the electro-optic device 600 discussed with reference to FIG. 6. In each case, the waveguides 524, 526 are patterned to form a Mach-Zehnder interferometer. Of course, those skilled in the art will be able to adapt these bias electrode structure designs to other embodiments of the instant invention and/or other waveguide patterns. To simplify the drawings, the RF electrode structure 540, 542, 544 has been omitted from the plan views.

Referring to FIG. 8, there is shown an embodiment where the bias electrode structure 570, 572, 574, 576 substantially shadows the RF electrode structure (not shown). In particular, both the elongated upper split portions 570b, 576b and the lower portions 570a, 570b substantially run under the RF electrode structure for the length of the parallel sections of the interferometer arms (i.e., the interaction distance). The ground electrodes 572, 574 are provided with ground potential. The bias signal electrode 570 is coupled to a low frequency or DC power source that provides the bias voltage (e.g., +5V). Optionally, the other bias signal electrode 576 is also coupled to a low frequency or DC power source (not shown) that provides another bias voltage (e.g., −5V). In this embodiment, the sectional view along line A-A corresponds to the sectional view provided in FIG. 5a.

Referring now to FIG. 9a, there is shown an embodiment where the bias ground electrodes 674, 672 and bias signal electrodes 670, 676 are segmented to suppress propagation of the RF signal along their length and reduce accumulated mechanical stress along their length. More specifically, the bias electrode material is patterned such that the segmented bias signal electrodes 670, 676 are coupled to outer bias signal electrodes 671, 677 with feed lines that extend between the bias ground electrode segments 674, 672. In general, the outer bias signal electrodes 671, 677 are fabricated with a relatively low series resistance to compensate for the high series resistance introduced by the narrow segmented bias electrodes 670, 676, respectively. The low series resistance provides the means for the bias signal voltage to be applied to the bias signal electrodes 670, 676 with minimal voltage drop. In this embodiment, the series resistance is reduced by providing a thin metal film 673, 679, such as Au, on top of the outer bias signal electrodes 671, 677, respectively. Alternatively, the series resistance is reduced by providing wide outer bias signal electrodes 671, 677.

As discussed above, the segmented bias signal electrodes 670, 676 are coupled to the outer bias electrodes 671, 677, respectively, at multiple feed points. For illustrative purposes, 3 feed points per bias signal electrode are shown. In other embodiments, feed points are provided every 0.25 to 5 mm. The feed points may be at regular intervals or may vary over the length of the waveguides. For example, with regard to the latter, the spacing between feed points may vary incrementally (i.e., such that each successive spacing differs) or may vary step-wise (i.e., such that at least some successive spacings are the same).

Figure 9B:
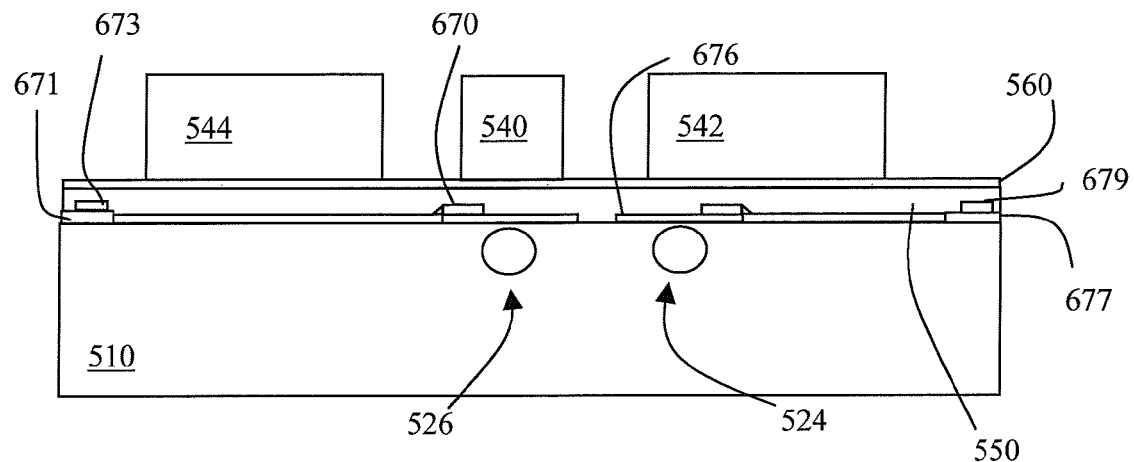
FIG. 9b is a sectional view of the embodiment illustrated in FIG. 9a taken along line B-B.

As illustrated in FIG. 9b, which is a sectional view along line B-B, the feed lines coupling the segmented bias signal electrodes 670, 676 to the outer bias signal electrodes 671, 677, respectively, are formed from the same layer used to form the high resistivity upper portions 670b, 676b. In this embodiment, the high resistivity material used to form the upper portions advantageously does not cross-over the optical waveguides, thus minimizing optical loss.

Figure 9C:
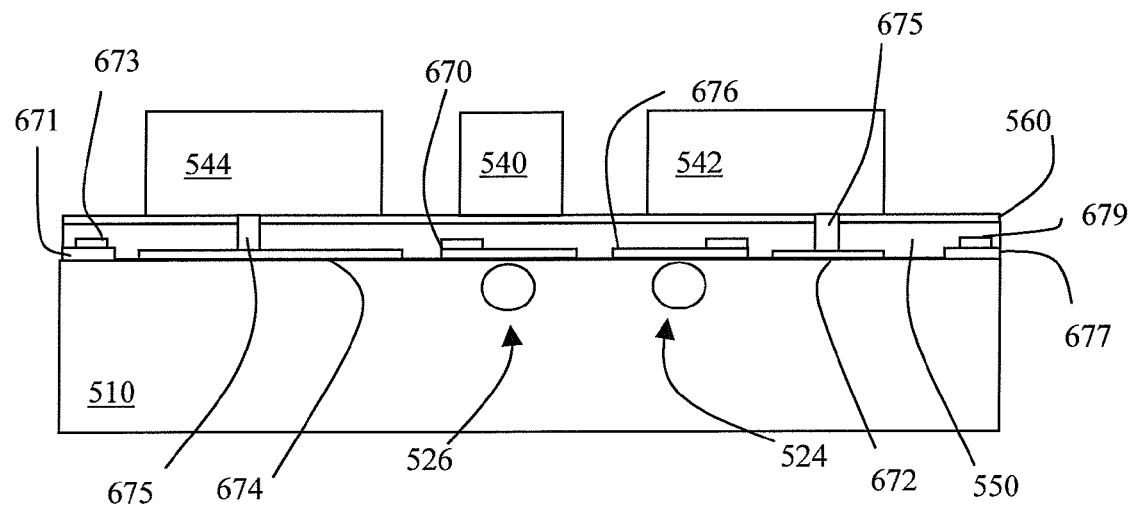
FIG. 9c is a sectional view of the embodiment illustrated in FIG. 9a taken along line C-C.

As illustrated in FIG. 9c, which is a sectional view along line C-C, each segmented bias ground electrode 674, 672 is electrically coupled to the overlying RF ground electrodes 542, 544 through a via 675 (e.g., a Au via formed by etching the bleed and buffer layers).

The RF ground electrodes 542, 544, and thus bias ground electrodes 672, 674, are provided with a ground potential. The outer bias electrode 671 is coupled to a low frequency or DC power source that provides the bias voltage (e.g., +5V). Optionally, the other outer bias signal electrode 677 is also coupled to a low frequency or DC power source (not shown) that provides another bias voltage having the opposite sign (e.g., −5V).

Referring to FIG. 10, there is shown another embodiment having bias electrodes that are segmented to suppress propagation of the RF signal along their length. In this embodiment, the high resistivity bias electrode material is patterned such that each segmented bias signal electrode 570, 576 is coupled to an outer bias signal electrode 577, 571, with feed lines that extend between segments of the other bias signal electrode 576, 570, respectively. More specifically, feed lines couple the segmented bias signal electrode 570 for the first waveguide 526 to outer bias electrode 577, and couple the segmented bias signal electrodes 576 for the second waveguide 524 to outer bias electrode 571. As a result, the outer bias electrode 571 functions as the ground electrode for the segmented bias electrodes 570, whereas the outer bias electrode 577 functions as the ground electrode for the segmented bias electrodes 576. The outer bias electrode 571 is coupled to a low frequency or DC power source that provides a first bias voltage (e.g., −5V), whereas the other outer bias signal electrode 577 is coupled to a low frequency or DC power source that provides a second bias voltage (e.g., +5V). Advantageously, this push-pull arrangement maximizes the modulation efficiency of the segmented bias electrodes.

In general, the outer bias signal electrodes 571, 577 are fabricated with a relatively low series resistance to compensate for the high series resistance introduced by the narrow segmented bias electrodes 576, 570, respectively. The low series resistance provides the means for the bias signal voltages to be applied to the bias signal electrodes 570, 576 with minimal voltage drop. In this embodiment, the series resistance is reduced by providing a thin metal film 573, 579, such as Au, on top of each outer bias signal electrode 571, 577, respectively, at the outer perimeter, to prevent any coupling of RF to the thin metal layer. Alternatively, the series resistance is reduced by providing wide outer bias signal electrodes 571, 577.

As discussed above, the segmented bias signal electrodes 570, 576 are coupled to the outer bias electrodes 577, 571, respectively, at multiple feed points. For illustrative purposes, 2 feed points per bias signal electrode are shown. In other embodiments, feed points are provided every 0.25 to 5 mm. In one embodiment, the feed lines are fabricated from the high resistivity material used to form the upper split portions. In another embodiment, the ultra-high resistivity material used to form the lower portions forms at least part of the feed lines (e.g., in regions where the feed lines cross an optical waveguide).

Optionally, the design of bias electrodes 570, 576 is selected to provide a tailored frequency response. For example, in FIG. 10 the segments on the right hand side the drawing are longer and have a wider gap between the elongated segments of the upper split portions, whereas the segments on the left-hand side of the drawing are shorter and have a narrower gap between the elongated segments of the upper split portions. The longer bias signal electrode segments have a larger series resistance and nearly the same capacitance, hence the RC time constant for these bias electrode segments will be much longer. The gap in the upper split portions electrodes is wider for the longer electrode segments, reducing modulation efficiency per unit length, but leaving capacitance per unit length about the same. The capacitance changes very little as a function of the gap in the upper split portion whereas modulation efficiency as given by $V_\pi L$ changes dramatically. Hence, the modulation efficiency of the segments with a longer time constant can be adjusted independently of the modulation efficiency of the segments with shorter time constant. Optionally, three or more groups of bias signal electrode segments with different RC time constants and $V_\pi L$, allowing for a wide variety of tailored frequency response. In one embodiment, the bias electrode structure is designed to compensate for other effects that influence bias frequency response, creating a modulation efficiency that changes very little as frequency changes. For example, short term conductivity effects in the substrate or at the substrate surface may influence the bias electrode frequency response. The use of multiple tailored time constants in the bias electrode response may compensate for these effects, leading to a flat frequency response. A flatter bias frequency response improves performance of bias control circuits. A bias electrode with flat low frequency response is also useful for any applications where the bias or other modulation signal must be slowly swept or varied over time in a predictable manner.

Advantageously, the electro-optic devices described with regard to FIGS. 5a, 6, 7, 8, 9a,b,c and 10 are humidity tolerant. In particular, humidity tolerance is provided by burying the bias electrodes below the buffer layer so that they are protected from humidity, and so that electro-migration corrosion of the buried bias electrodes is reduced. Optionally, humidity tolerance is improved by eliminating the RF electrode adhesion layer, by encapsulating the RF electrode adhesion layer, and/or by using an RF electrode adhesion layer having a work function similar to the material used to form the RF electrodes. Further optionally, humidity tolerance is improved by allowing the bias electrodes to be DC isolated from the RF electrodes 540, 542.

According to one embodiment, DC isolation is provided by passing the signal from an RF generator through a low pass filter onto the bias signal electrode (e.g., 570), and through a high pass filter onto the RF signal electrode (e.g., 540). Advantageously, this arrangement boosts the high end frequency response to the incoming bias signal, accommodating dither signals or other tones in the MHz frequency range, that are often summed in with the slowly varying bias voltage. According to another embodiment, a bias-tee is used to couple the bias signal electrode (e.g., 570) and the RF signal electrode (e.g., 540). Of course, various other bias control circuits are also envisioned.

In each of the above-described embodiments, the buried bias electrodes include a first part that is in contact with and is disposed above a relatively transparent second part. The first part includes at least one strip that is shifted laterally with respect to the center of the optical waveguide to minimize optical loss. The optically transparent second part includes a strip that is disposed directly above the optical waveguide to improve bias electrode modulation efficiency without introducing significant optical loss. Since two materials and/or thicknesses are used for the first and second parts, there is less compromise between optical transparency, RF transparency, and series resistance.

Figure 11:
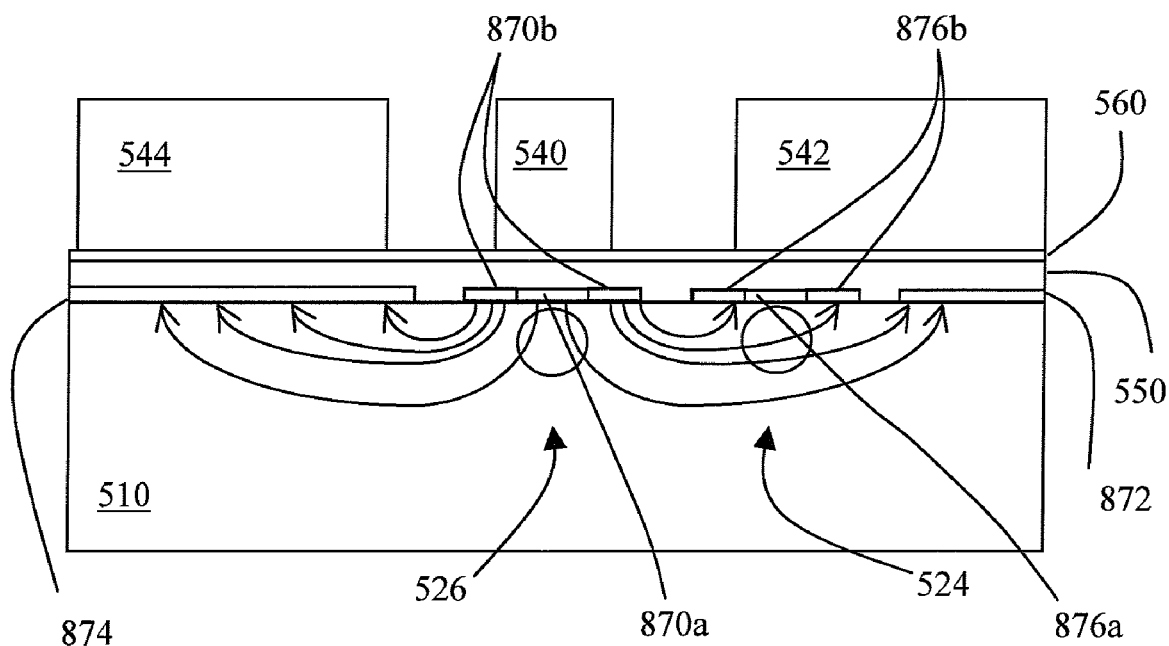
FIG. 11 is a sectional view of an electro-optic device in accordance with an embodiment of the instant invention.

Alternatively, the advantages of using a two-part buried bias electrode are realized by providing a first part that is in contact with and is disposed adjacent a relatively transparent second part, as illustrated in FIG. 11. In this embodiment, the first part includes at least one strip 870b, 876b that is shifted laterally with respect to the center of the optical waveguide to minimize optical loss. The second part includes a strip 870a, 876a that is disposed directly above the optical waveguide to improve bias electrode modulation efficiency without introducing significant optical loss. Since two materials and/or thicknesses are used for the first and second parts, there is less compromise between optical transparency, RF transparency, and series resistance.

Figure 12:
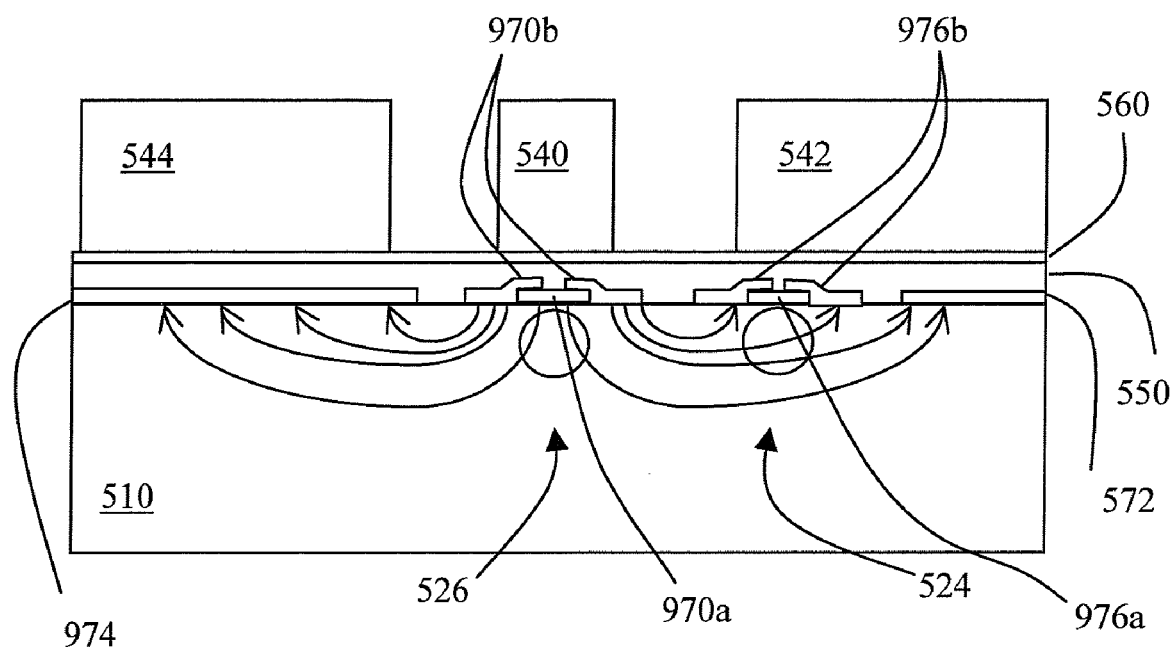
FIG. 12 is a sectional view of an electro-optic device in accordance with an another embodiment of the instant invention.

Further alternatively, the advantages of using a two-part buried bias electrode are realized by providing a first part that is at least partially deposited on top of a relatively transparent second part, to improve contact, as illustrated in FIG. 12. In this embodiment, the first part includes at least one layer 970b, 976b that is shifted laterally with respect to the center of the optical waveguide to minimize optical loss. The second part includes a layer 970a, 976a that is disposed directly above the optical waveguide to improve bias electrode modulation efficiency without introducing significant optical loss. Since two materials and/or thicknesses are used for the first and second parts, there is less compromise between optical transparency, RF transparency, and series resistance.

Figure 13:
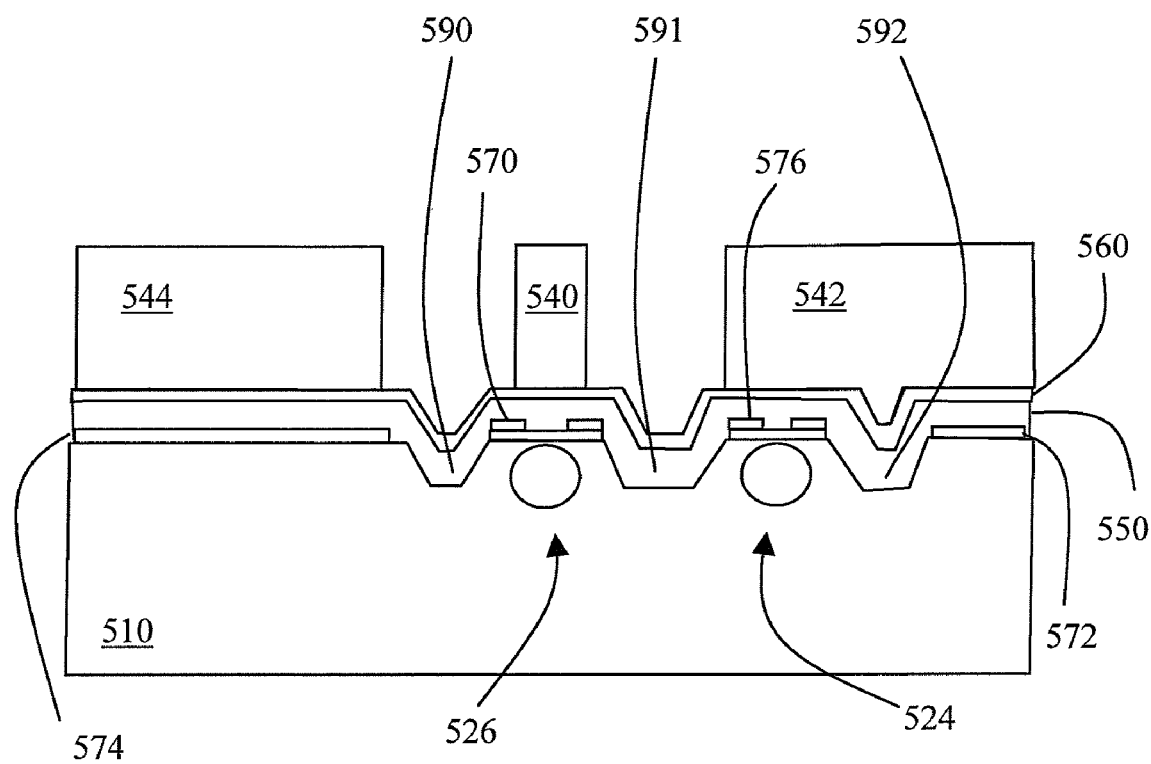
FIG. 13 is a sectional view of an electro-optic device in accordance with yet another embodiment of the instant invention.

While the stacked designs discussed above are particularly valuable for electro-optic devices based on Z-cut $LiNbO_3$ or Z-cut $LiTaO_3$, where the bias electrodes are generally disposed above the waveguides, they are also envisaged for use with other substrates and or configurations. For example, in one embodiment the bias electrode material(s) are disposed on a substrate that has been etched to include grooves 590, 591, 592, as illustrated in FIG. 13. In yet another embodiment, the substrate includes one of X-cut $LiNbO_3$, X-cut $LiTaO_3$, Y-cut $LiNbO_3$, Y-cut $LiTaO_3$, gallium arsenide (GaAs), indium phosphide (InP), and electro-optic polymer.

Of course, the embodiments of the invention described above have been presented by way of example only. It will be understood by those skilled in the art that various omissions and substitutions may be made without departing from the spirit and scope of the invention as defined by the appended claims.

We claim:
1. An electro-optic device comprising:
   a substrate having an optical waveguide formed therein;
   a bias electrode structure disposed for generating a low frequency or DC electric field in the optical waveguide, the bias electrode structure including a first bias electrode having an first portion and a second portion, the first portion including a strip disposed directly above and substantially aligned with a center of the optical waveguide, the first portion having a higher transparency than the second portion;
   an RF electrode structure disposed for generating an RF electric field in the optical waveguide, the RF electrode structure including a first RF electrode; and
   a buffer layer disposed between the first RF electrode and the first bias electrode.

2. An electro-optic device according to claim 1, wherein the first portion comprises a first material, the second portion comprises a second material, and the first material has a higher resistivity than the second material.

3. An electro-optic device according to claim 1, wherein the first portion comprises a first layer having a first thickness, the second portion comprises a second layer having a second thickness, and the first thickness is smaller than the second thickness.

4. An electro-optic device according to claim 1, wherein the first portion comprises one of a tantalum silicon nitride layer and a titanium silicon nitride layer having a resistivity greater than about $10^6$ ohm-cm ($\Omega$-cm) @25° C.

5. An electro-optic device according to claim 1, wherein the first portion comprises one of a tantalum silicon nitride layer and a titanium silicon nitride layer having a thickness less than about 150 Å.

6. An electro-optic device according to claim 1, wherein the second portion further comprises a first elongated segment shifted laterally relative to the center of the optical waveguide, the first elongated segment disposed for contributing to the low frequency or DC electric field generated in the optical waveguide.

7. An electro-optic device according to claim 6, wherein the second portion comprises a second elongated segment shifted laterally relative to the center of the optical waveguide, the first and second elongated segments disposed on opposite sides of the optical waveguide.

8. An electro-optic device according to claim 1, wherein the first bias electrode and the first RF electrode are substantially aligned with the optical waveguide.

9. An electro-optic device according to claim 1, wherein the first portion comprises one of an $In_2O_3$, $SnO_2$, and ZnO layer having a thickness less than about 150 Å.

10. An electro-optic device according to claim 9, wherein the second portion comprises one of a tantalum silicon nitride layer and a titanium silicon nitride layer having a resistivity between about $10^4$ ohm-cm and about $10^6$ ohm-cm.

11. An electro-optic device according to claim 4, wherein the second portion comprises one of a tantalum silicon nitride layer and a titanium silicon nitride layer having a resistivity between about $10^4$ ohm-cm and about $10^6$ ohm-cm.

12. An electro-optic device according to claim 1, wherein the second portion comprises one of a tantalum silicon nitride layer and a titanium silicon nitride layer having a resistivity between about $10^4$ ohm-cm and about $10^6$ ohm-cm.

13. An electro-optic device according to claim 1, comprising a bleed layer disposed between the first RF electrode and the buffer layer.

14. An electro-optic device according to claim 13, wherein the bleed layer comprises one of tantalum silicon nitride and titanium silicon nitride, and wherein the first RF electrode is deposited on the bleed layer in the absence of an adhesion layer.

15. An electro-optic device according to claim 1, wherein the first bias electrode is DC isolated from the first RF electrode.

16. An electro-optic device according to claim 1, wherein the first bias electrode comprises a first bias signal electrode having a first plurality of elongated segments.

17. An electro-optic device according to claim 16, wherein each segment of the first plurality of elongated segments is coupled to a common bias electrode.

18. An electro-optic device according to claim 17, wherein the common bias electrode is coupled to a high conductivity strip along its length.

19. An electro-optic device according to claim 16, wherein the common bias electrode is coupled to the first plurality of elongated segments with a plurality of feed lines that extend through a second plurality of elongated segments of a second bias signal electrode.

20. An electro-optic device according to claim 16, wherein the common bias electrode is coupled to the first plurality of elongated segments with a plurality of feed lines spaced in dependence upon a predetermined frequency response of the bias electrode structure.

21. An electro-optic device according to claim 1, wherein the electro-optic substrate comprises one of Z-cut lithium niobate and Z-cut lithium tantalate.

22. An electro-optic device according to claim 1, wherein the first bias electrode comprises at least one layer formed of a material having a resistivity that is higher than a resistivity of the first RF electrode and lower than a resistivity of the substrate.

23. A method of fabricating an electro-optic device comprising:
   providing a substrate having an optical waveguide formed therein;
   forming a first bias electrode layer on the substrate, the first bias electrode layer patterned to provide a strip disposed directly above and substantially aligned with a center of the optical waveguide;
   forming a second bias electrode layer on at least one of the first bias electrode layer and the substrate, the second bias electrode layer patterned to include at least one strip shifted laterally relative to the center of the optical waveguide, the first bias electrode layer having a higher optical transparency than the second bias electrode layer;
   forming a buffer layer on the first and second bias electrode layers; and
   forming an RF electrode layer on the buffer layer, the RF electrode layer patterned to include a first RF electrode.

* * * * *